US011681847B2

(12) United States Patent
Su et al.

(10) Patent No.: US 11,681,847 B2
(45) Date of Patent: Jun. 20, 2023

(54) METHOD OF MANUFACTURING SEMICONDUCTOR DEVICE AND SYSTEM FOR SAME

(71) Applicant: TAIWAN SEMICONDUCTOR MANUFACTURING COMPANY, LTD., Hsinchu (TW)

(72) Inventors: Ke-Ying Su, Hsinchu (TW); Ze-Ming Wu, Hsinchu (TW); Po-Jui Lin, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/199,023

(22) Filed: Mar. 11, 2021

(65) Prior Publication Data

US 2022/0012401 A1 Jan. 13, 2022

Related U.S. Application Data

(60) Provisional application No. 63/048,925, filed on Jul. 7, 2020.

(51) Int. Cl.
*G06F 30/392* (2020.01)
*G06F 30/398* (2020.01)
(Continued)

(52) U.S. Cl.
CPC .......... *G06F 30/392* (2020.01); *G06F 30/398* (2020.01); *G06F 2111/20* (2020.01); *G06F 2119/18* (2020.01)

(58) Field of Classification Search
USPC ........................................................ 716/54
See application file for complete search history.

(56) References Cited

U.S. PATENT DOCUMENTS 7,260,442 B2   8/2007 Hwang et al.
8,984,459 B2   3/2015 Chen et al.
(Continued)

FOREIGN PATENT DOCUMENTS

CN   104933214   9/2015
TW   201734869   10/2017
(Continued)

OTHER PUBLICATIONS

Office Action dated Apr. 27, 2022 for corresponding case No. TW 11120412190. (pp. 1-8).

*Primary Examiner* — Mohammed Alam
(74) *Attorney, Agent, or Firm* — Hauptman Ham, LLP

(57) ABSTRACT

A method is disclosed for storing and reusing the PC description of layout cells. A database stores predefined cells and PC descriptions that were previously calculated by a 3D field solver. Regarding a candidate cell from the layout diagram, the database is searched for a substantial match amongst the predefined cells. If there is a match, then the stored PC description of the matching predefined cell is assigned to the candidate cell in the layout diagram, which avoids having to make a discrete calculation for the PC description. If there is no match, then the 3D field solver is applied to the candidate cell in order to calculate the PC description of the candidate cell. To facilitate reusing the newly calculated PC description, the candidate cell and the newly calculated PC description are stored in the database as a new predefined cell and its corresponding PC description.

20 Claims, 19 Drawing Sheets

(51) Int. Cl.
*G06F 119/18* (2020.01)
*G06F 111/20* (2020.01)

(56) References Cited

U.S. PATENT DOCUMENTS

| | | | |
|---|---|---|---|
| 9,256,709 B2 | 2/2016 | Yu et al. | |
| 2003/0237063 A1* | 12/2003 | Kauth | G06F 30/398 |
| | | | 716/115 |
| 2007/0106969 A1* | 5/2007 | Birch | G06F 30/394 |
| | | | 716/113 |
| 2014/0040838 A1 | 2/2014 | Liu et al. | |
| 2015/0278429 A1 | 10/2015 | Chang | |
| 2018/0239857 A1* | 8/2018 | Qin | H01L 27/0207 |
| 2022/0012401 A1* | 1/2022 | Su | G06F 30/367 |

FOREIGN PATENT DOCUMENTS

| | | |
|---|---|---|
| TW | 201923823 | 6/2019 |
| TW | 202018553 | 5/2020 |

* cited by examiner

FROM BLOCK 305 (NO) in FIG. 3A

↓ implement a 3D field solver tool on candidate cell to discretely calculate a IPC for candidate cell when candidate cell does not match any of PDC
318

↓ assign calculated IPC to candidate cell in layout diagram when candidate cell does not match any of PDC
320

↓ append database to include: candidate cell as a new one of PDCs and calculated IPC for candidate cell as an IPC for new one of PDCs.
322

↓ select, in layout diagram, a candidate layout group including candidate and a first set of one or more of layout cells which are adjacent to first one of layout cel
324

↓

TO BLOCK 326 in FIG. 3E

METHOD OF MANUFACTURING SEMICONDUCTOR DEVICE AND SYSTEM FOR SAME

PRIORITY CLAIM

The instant application is a non-provisional application claiming priority to provisional Application No. 63/048,925, filed Jul. 7, 2020, the entire contents of which are incorporated by reference herein.

BACKGROUND

The recent trend in miniaturizing integrated circuits (ICs) has resulted in smaller devices that provide more functionality at higher speeds than before. The miniaturization process has also increased the devices' susceptibility to the increasing effects of parasitic capacitance. In order to design smaller and more effective ICs, the parasitic capacitance of these IC devices has to be modeled more accurately and efficiently.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3A-FIG. 3E is a flowchart that describes procedures for designating an intracell parasitic capacitance and an intercell parasitic capacitance to layout cells in a layout diagram, in accordance with some embodiments.

DETAILED DESCRIPTION

Figure 1:
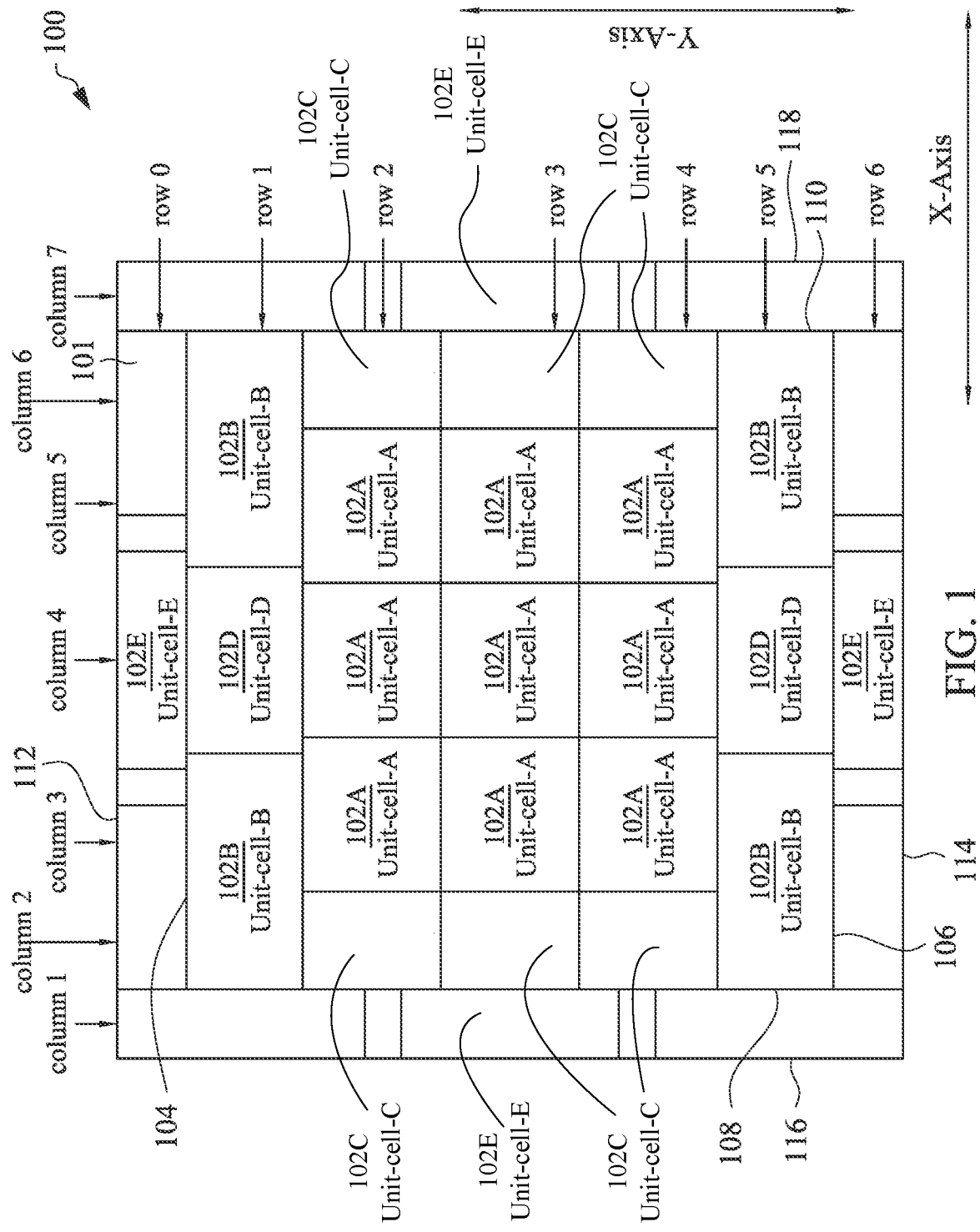
FIG. 1 is a layout diagram of a semiconductor device, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Various embodiments provide corresponding procedures and techniques for efficiently determining parasitic capacitance descriptions of the cells in a layout diagram. According to another approach, a discrete calculation is made of the parasitic capacitance (PC) description for each cell in a layout diagram. As technology progresses, e.g., as miniaturization continues, the number of cells in layout diagram increases, which results in the other approach becoming more computationally expensive, slower, or the like.

As part of developing various embodiments, the inventors of the present embodiments recognized that layout diagrams typically include cells which are coincidentally found in other layout diagrams (recurring cells), e.g., cells taken from a standard cell library, and that at least some of the PC description for a given recurring cell represents an opportunity to simplify, if not avoid having to make, a discrete calculation PC description for the given recurring cell when the given recurring cell is included a new layout diagram. As part of developing various embodiments, the inventors of the present embodiments also recognized that a typical new layout diagram includes substantial numbers of repeated cells, and that at least some of the PC description for a first one of the repeated cells represents an opportunity to simplify, if not avoid having to make, a discrete calculation PC description for the remaining ones of the repeated cells in the new layout diagram. Accordingly, in some embodiments, a method is disclosed for storing and reusing the PC description of recurring cells which thereby avoids otherwise having to discretely calculate a PC description for the candidate cell.

In some embodiments, a method for efficiently determining parasitic capacitance descriptions of cells in a layout diagram includes: selecting a candidate cell from amongst the layout cells in the layout diagram; within a database which stores predefined cells and corresponding parasitic capacitance (PC) descriptions thereof, searching the database for a matching predefined cell one amongst the predefined cells that is a substantial match to the candidate cell; and, when a substantial match is found, assigning the PC description of the matching predefined cell to the candidate cell. Accordingly, by assigning the PC description of the matching predefined cell to the candidate cell, such embodiments avoid otherwise having to discretely calculate a PC description for the candidate cell, and thus such embodiments are computationally less expensive, faster, or the like, as compared to the other approach, especially when taking into consideration the typically substantial numbers of repeated cells in layout diagrams. In some embodiments, if there is no match, then the 3D field solver is applied to the candidate cell in order to calculate the PC description of the candidate cell. In some embodiments, when no substantial match is found, a PC description for the candidate cell is calculated, and the database is appended to include: the candidate cell as a new one of the predefined cells; and the PC description for the candidate cell as a PC description for the new one of the predefined cells.

FIG. 1 is a floorplan diagram 100 of a semiconductor device, in accordance with some embodiments.

Floorplan diagram 100 is a type of layout diagram. Floorplan diagram 100 includes a representation of at least one semiconductor substrate 101, parts of which are included in corresponding instances of layout cells 102A, 102B, 102C, 102D, 102E. In some embodiments, layout cells 102A, 102B, 102C, 102D, 102E each represent different types of integrated circuits (IC) including memory cells, a power control circuit, an inverter, a latch, a buffer and/or any other type of circuit arrangement that is representable digitally in a cell library.

Each of layout cells 102A, 102B, 102C, 102D, 102E experiences a corresponding overall parasitic capacitance (PC). In some embodiments, the overall PC is described in terms of two components. Regarding the first PC component, each of the layout cells experiences an internal PC, referred to herein as intracell PC (discussed below). Regarding the second PC component, each of the layout cells experiences an external PC with respect to neighboring layout cells, referred to herein as intercell PC.

Floorplan diagram 100 is a digital representation of a semiconductor device where layout cells 102A, 102B, 102C, 102D, 102E operate to perform one or more given functions. In some embodiments, layout diagram is described/couched digitally in a binary file format (e.g., Graphic Database System II (GDSII) stream format), where the binary file format represents planar geometric shapes, text labels, other information and the like in hierarchical form. In some embodiments, synthesis, placement and routing have been performed on floorplan diagram 100 specific to a particular process node.

Floorplan diagram 100 includes boundary lines and outer boundary lines. Floorplan diagram 100 includes layout cells 102A, 102B, 102C, 102D within an upper boundary 104, a lower boundary 106, a left boundary 108, and a right boundary 110. Upper boundary 104 and lower boundary 106 extend in a first direction (horizontal direction with respect to FIG. 1) that is parallel to an X-axis. The left boundary 108 and the right boundary extend in a second direction (vertical direction with respect to FIG. 1) that is parallel to a Y-axis, where the X-axis and the Y-axis are perpendicular to one another. Within upper boundary 104, lower boundary 106, left boundary 108, and right boundary 110, floorplan diagram 100 has layout cells 102A, 102B, 102C, 102D so that layout cells 102A, 102B, 102C, 102D are positioned in a grid.

In FIG. 1, the grid has four rows and a seven columns. In other embodiments, the grid has more or less than four rows. In still other embodiments, each row has the same number of columns. In other embodiments, each column has a different number of rows. From left to right with respect to row 1, row 1 includes a layout cell 102B in column (clmn) 2 and column 3, a layout cell 102D in column 4, and a layout cell 102B in column 5 and column 6. From left to right with respect to row 2, row 2 includes a layout cell 102C in column 2, a layout cell 102A in column 3, a layout cell 102A in column 4, a layout cell 102A in column 5, and a layout cell 102C in column 6. From left to right with respect to row 3, row 3 includes a layout cell 102C in column 2, a layout cell 102A in column 3, a layout cell 102A in column 4, a layout cell 102A in column 5, and a layout cell 102C in column 6. From left to right with respect to row 4, row 4 includes a layout cell 102C in column 2, a layout cell 102A in column 3, a layout cell 102A in column 4, a layout cell 102A in column 5, and a layout cell 102C in column 6. From left to right with respect to row 5, row 5 includes a layout cell 102B in column 2 and column 3, a layout cell 102D in column 4, and a layout cell 102B in column 5 and column 6.

Floorplan diagram 100 also includes an upper outer boundary 112, a lower outer boundary 114, a left outer boundary 116, and a right outer boundary 118. Layout cells 102E are peripheral layout cells that are located between interior boundaries 104, 106, 108, 110 and exterior boundaries 112, 114, 116, 118 of the semiconductor device so that a top layout cell 102E, a lower layout cell 102E, a left layout cell 102E and a right layout cell 102E are provided in floorplan diagram 100. The left boundary of top layout cell 102E is aligned with respect to the X-axis to extend over the left layout cell 102B in row 1 and the right boundary of the top layout cell 102E is aligned with respect to the X-axis to extend over the right layout cell 102B in row 1. A top boundary of the top layout cell 102E is aligned with upper outer boundary 112 and a lower boundary of the top layout cell 102E is aligned with top boundary 104.

The left boundary of bottom layout cell 102E is aligned with respect to the X-axis to extend over left layout cell 102B in row 5 and the right boundary of bottom layout cell 102E is aligned with respect to the X-axis to extend over right layout cell 102B in row 5. A top boundary of bottom layout cell 102E is aligned with lower boundary 106 and a lower boundary of bottom layout cell 102E is aligned with top boundary 104.

The top boundary of left layout cell 102E is aligned with respect to the Y-axis to extend next to top left most layout cell 102C in row 1 and the bottom boundary of left layout cell 102E is aligned with respect to the Y-axis to extend next to bottom left layout cell 102C in row 5. A left boundary of left layout cell 102E is aligned with left outer boundary 116 and a right boundary of left layout cell 102E is aligned with right boundary 108.

The top boundary of right layout cell 102E is aligned with respect to the Y-axis to extend next to the top right most layout cell 102C in row 1 and the bottom boundary of left layout cell 102E is aligned with respect to the Y-axis to extend next to bottom right layout cell 102C in row 5. A left boundary of left layout cell 102E is aligned with left boundary 110 and a right boundary of left layout cell 102E is aligned with right exterior boundary 118.

In some embodiments, floorplan diagram 100 represents a simplified configuration of an SRAM memory circuit. In floorplan diagram 100, layout cells 102A are repeated layout cells 102A. Each of layout cells 102A have substantially the same cell configuration. In some embodiments, layout cells 102A are exactly the same. In some embodiments, at least some of layout cells 102A have minor differences in configuration, e.g., differences which depend on their position on the grid, such as minor differences in metallic routing. Accordingly, each of layout cells 102A is an instance of a basic cell. In floorplan diagram 100, the basic cell is repeated. The repeated basic cell is referred to herein as a unit layout cell, such that each layout cell 102A in floorplan diagram 100 is further labeled as Unit-cell-A. In some embodiments, Unit-cell-A 102A is an SRAM memory cell.

In floorplan diagram 100, layout cells 102B are repeated layout cells 102B. Each of layout cells 102B have substantially the same cell configuration. In some embodiments, layout cells 102B are exactly the same. In some embodiments, at least some of layout cells 102B have minor differences in configuration, e.g., differences which depend on their position on the grid, such as minor differences in metallic routing. Accordingly, each of layout cells 102B is an instance of a unit layout cell (Unit-cell-B). In some embodiments, Unit-cell-B 102B is an SRAM bit line driver.

In floorplan diagram 100, layout cells 102C are repeated layout cells 102C. Each of layout cells 102C have substantially the same cell configuration. In some embodiments, layout cells 102C are exactly the same. In other embodiments, at least some of layout cells 102C have minor differences in configuration, e.g., differences which depend on their position on the grid, such as minor differences in metallic routing. Accordingly, each of layout cells 102C is an instance of a unit layout cell (Unit-cell-C). In some embodiments, Unit-cell-C 102C is an SRAM word line driver.

In floorplan diagram 100, layout cells 102D are repeated layout cells 102D. Each of layout cells 102D have substantially the same cell configuration. In some embodiments, layout cells 102D are exactly the same. In other embodiments, at least some of layout cells 102D have minor differences in configuration, e.g., differences which depend on their position on the grid, such as minor differences in metallic routing. Accordingly, each of layout cells 102D is an instance of a unit layout cell (Unit-cell-D). In some embodiments, Unit-cell-D 102D is an SRAM sense amplifier.

In floorplan diagram 100, layout cells 102E are repeated layout cells 102E. Each of layout cells 102E have substantially the same cell configuration. In some embodiments, layout cells 102E are exactly the same. In other embodiments, at least some of layout cells 102E have minor differences in configuration, e.g., differences which depend on their position on the grid, such as minor differences in metallic routing. Accordingly, each of layout cells 102E is an instance of a unit layout cell (Unit-cell-E). In some embodiments, Unit-cell-E 102E is an SRAM bit line driver. In some embodiments, unit layout cell (Unit-cell-E) is a power control circuit.

Layout cells 102E are peripheral cells that are provided outside of boundaries 104, 106, 108, 110. As such, layout cells 102E have neighboring cells within boundaries 104, 106, 108, 110 and none outside boundaries 104, 106, 108, 110. In some embodiments, layout cells 102E have approximately half the number of neighboring cells as layout cells 102A, 102B, 102C, 102D, which are within boundaries 104, 106, 108, 110.

In some embodiments, layout cells 102A, 102B, 102C, 102D, 102E are identical to their respective unit layout cells Unit-cell-A, Unit-cell-B, Unit-cell-C, Unit-cell-D, Unit-cell-E. For example, the PC components of layout cells 102A, 102B, 102C, 102D, 102E are provided by the PC components of corresponding standard cells in a cell library, which in some embodiments define the unit layout cells Unit-cell-A, Unit-cell-B, Unit-cell-C, Unit-cell-D, Unit-cell-E. In some embodiments, there are minor differences in the upper layer metallic routing of layout cells 102A, 102B, 102C, 102D, 102E and their corresponding unit layout cells Unit-cell-A, Unit-cell-B, Unit-cell-C, Unit-cell-D, Unit-cell-E. In some embodiments, the PC of upper layer metallic routing is calculated separately from the PC determined from unit layout cells Unit-cell-A, Unit-cell-B, Unit-cell-C, Unit-cell-D, Unit-cell-E by 3D tools.

In many semiconductor devices (e.g., SRAM memory circuits), represented by floorplan diagram 100, different types of layout cells are repeated in the semiconductor device. As advanced technology nodes get smaller and smaller, accurately obtaining a parasitic capacitance of each of layout cells 102A, 102B, 102C, 102D, 102E is becoming more important in obtaining a floorplan diagram 100 with circuitry that functions appropriately. In some embodiments, modeling the parasitic capacitance of layout cells 102A, 102B, 102C, 102D, 102E in floorplan diagram 100 with advanced technology nodes is done within an accuracy of less than 1%. Three dimensional (3D) solver tools are often used in order to provide this type of accuracy. In some embodiments, EDA system 200 (see FIG. 2) includes 3D solver tools. Typically, 3D solver tools are computationally intensive. In some circumstances, 3D solver tools represent a bottleneck amongst the various tools included in EDA system 200 in terms of computational delays. In some embodiments, 3D field solver tools solve Laplace's equation to obtain the parasitic capacitance (PC) description for a layout cell (e.g., layout cells 102A, 102B, 102C, 102D, 102E). This disclosure describes procedures and techniques for characterizing repeated instances of layout cells (e.g., layout cells 102A, 102B, 102C, 102D, 102E) as layout unit cells (e.g., Unit-cell-A, Unit-cell-B, Unit-cell-C, Unit-cell-D, Unit-cell-E) and then storing and reusing the PC description of those layout unit cells. In this manner, a 3D field solver tool does not have to be implemented every time a layout diagram includes an instance of the unit cell. In at least some embodiments, for a unit layout cell (e.g., Unit-cell-A, Unit-cell-B, Unit-cell-C, Unit-cell-D, Unit-cell-E) repeated N times within floorplan diagram 100, a one-time unit cell extraction of PC (using the 3D solver tool) saves N−1 cell extraction repetitions by the 3D solver tool since the one-time unit cell extraction of PC is stored and used to determine the PC of the other instances of the repeated unit cell.

Figure 2:
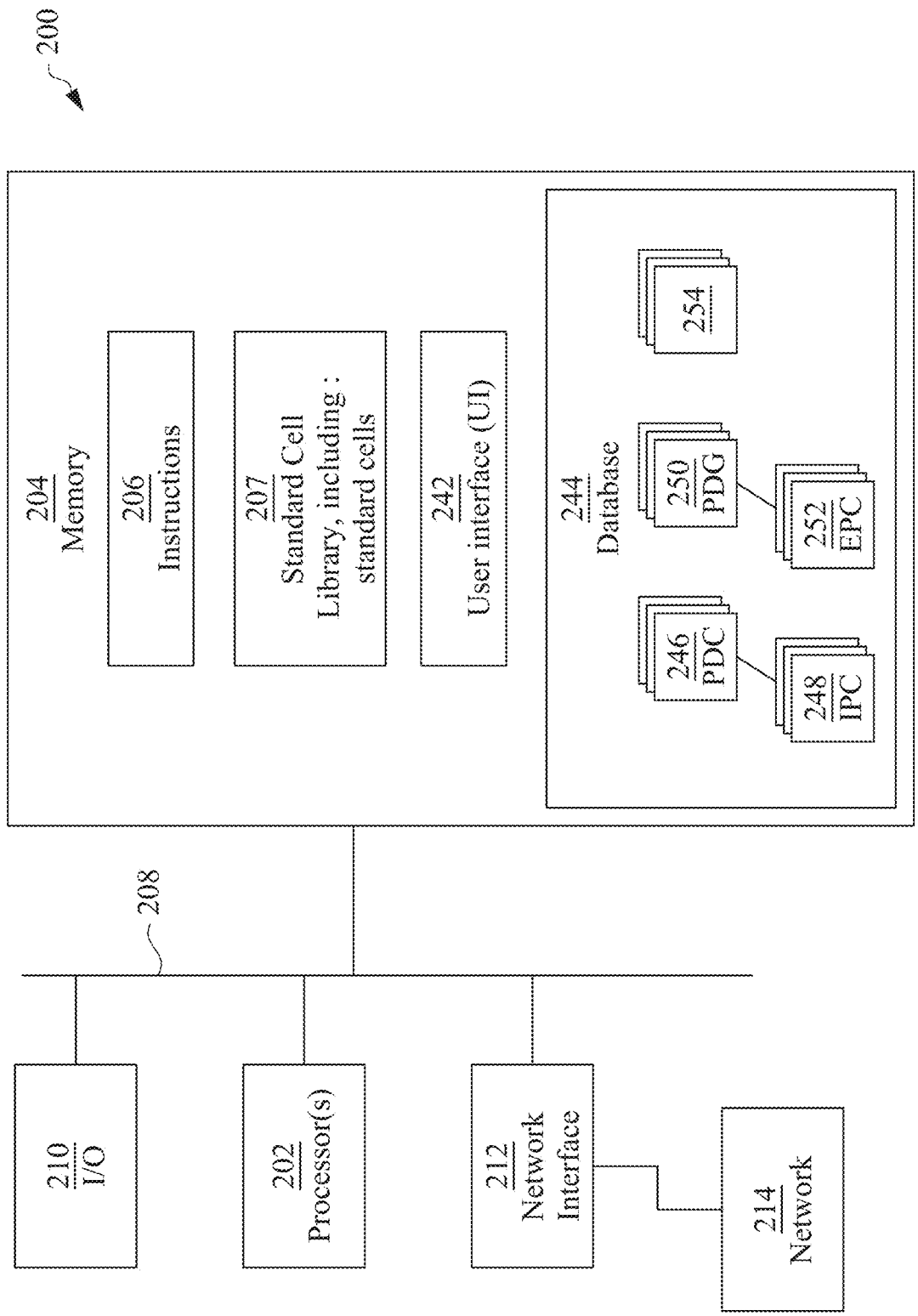
FIG. 2 is a block diagram of an electronic design automation (EDA) system, in accordance with some embodiments.

FIG. 2 is a block diagram of an electronic design automation (EDA) system 200, in accordance with some embodiments.

In some embodiments, EDA system 200 includes an automatic placement and routing system (APR) system. Methods described herein of assigning intracell PC descriptions and intercell PC descriptions to layout cells (e.g. layout cells) in a layout diagram (e.g., floorplan diagram 100), in accordance with one or more embodiments, are implementable, for example, using EDA system 200, in accordance with some embodiments.

In some embodiments, EDA system 200 is a general purpose computing device including a hardware processor 202 and a non-transitory, computer-readable storage medium 204. Storage medium 204, amongst other things, is encoded with, i.e., stores, computer executable code 206, i.e., a set of executable instructions. Execution of instructions 206 by hardware processor 202 represents (at least in part) an EDA tool which implements a portion or all of the methods described herein in accordance with one or more embodiments (hereinafter, the noted processes and/or methods).

Processor 202 is electrically coupled to computer-readable storage medium 204 via a bus 208. Processor 202 is also electrically coupled to an I/O interface 210 by bus 208. A network interface 212 is also electrically connected to processor 202 via bus 208. Network interface 212 is connected to a network 214, so that processor 202 and computer-readable storage medium 204 are capable of connecting to external elements via network 214. Processor 202 is configured to execute computer executable code 206 encoded in computer-readable storage medium 204 in order to cause system 200 to be usable for performing a portion or all of the noted processes and/or methods. In one or more embodiments, processor 202 is a central processing unit (CPU), a multi-processor, a distributed processing system, an application specific integrated circuit (ASIC), and/or a suitable processing unit.

In one or more embodiments, computer-readable storage medium 204 is an electronic, magnetic, optical, electromagnetic, infrared, and/or a semiconductor system (or apparatus or device). For example, computer-readable storage medium 204 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 204 includes a compact disk-read only memory (CD-ROM), a compact disk-read/write (CD-R/W), and/or a digital video disc (DVD).

In one or more embodiments, storage medium 204 stores computer executable code 206 configured to cause system 200 (where such execution represents (at least in part) the EDA tool) to be usable for performing a portion or all of the noted processes and/or methods. In one or more embodiments, storage medium 204 also stores information which facilitates performing a portion or all of the noted processes and/or methods. In one or more embodiments, storage medium 204 stores library 207 of standard cells (standard cell library 207) including such standard cells as disclosed herein. In one or more embodiments, storage medium 204 stores one or more layout diagrams 209 corresponding to one or more layouts disclosed herein.

EDA system 200 includes I/O interface 210. I/O interface 210 is coupled to external circuitry. In one or more embodiments, I/O interface 210 includes a keyboard, keypad, mouse, trackball, trackpad, touchscreen, and/or cursor direction keys for communicating information and commands to processor 202.

EDA system 200 also includes network interface 212 coupled to processor 202. Network interface 212 allows system 200 to communicate with network 214, to which one or more other computer systems are connected. Network interface 212 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 200.

System 200 is configured to receive information through I/O interface 210. The information received through I/O interface 210 includes one or more of instructions, data, design rules, libraries of standard cells, and/or other parameters for processing by processor 202. The information is transferred to processor 202 via bus 208. EDA system 200 is configured to receive information related to a UI through I/O interface 210. The information is stored in computer-readable medium 204 as user interface (UI) 242.

In FIG. 2, memory 204 further includes a database 244. Database 244 is configured to store predefined unit cells (PDCs) 246 and a corresponding intracell PC descriptions (IPC) 248 for each PDC 246. Mappings between instances of PDC 246 and corresponding instances of IPC 248 are represented in FIG. 2 by a line therebetween. A given instance of PDC 246 is an example of a unit cell. Together, the instances of PDC 246 provide a library of unit cells. In some embodiments, various instances of PDC 246 correspond to Unit-Cell-A 102A, Unit-Cell-B 102B, Unit-Cell-C 102C, Unit-Cell-D 102D, Unit-Cell-E 102E, or the like, in floorplan diagram 100. In some embodiments, various instances of PDC 246 correspond to unit layout cells in other layout diagrams. In some embodiments, the instances of PDC 246 are stored in standard cell library 207 and mappings are provided to corresponding instances of IPC 248 in database 244.

In some embodiments, to facilitate searching among the instances of PDC 246 in database 244, each instance of PDC 246 is configured with a corresponding hash value. In some embodiments, for a given instance of PDC 246, a hash value is generated by applying an appropriate hashing function to the given instance of PDC 246. Hash functions, hash values, and related figures of merit, are disclosed in U.S. Pat. No. 8,984,459, granted Mar. 17, 2015 (the '459 patent), the entirety of which is hereby incorporated by reference.

In some embodiments, each instance of PDC 246 is a unit cell that has been subjected to the 3D field solver tool and so has a corresponding IPC 248. An IPC quantifies and describes the internal PC of a corresponding layout cell resulting from the electromagnetic and/or electrostatic interaction of internal components, i.e., components within the layout cell. Accordingly, each IPC 248 stored in database 244 quantifies and describes the internal PC of a corresponding PDC 246. As an example, where a given layout cell in floorplan diagram 100 of FIG. 1, e.g., Unit-cell-A 102A in row 3 and column 4, substantially matches a given instance of PDC 246 in database 244, the corresponding given instance of IPC 248 is substituted as the IPC for the given layout cell (namely, Unit-cell-A 102A in row 3 and column 4) rather than making a new discrete calculation of the IPC for the given cell using the 3D field solver tool, thereby lessening computation loading and improving efficiency. In some embodiments, each IPC 248 is formatted as a netlist (e.g., ".spef"—the input file format of some commercial circuit simulators).

Database 244 is also configured to store predefined groups (PDGs) 250 of PDCs 246. Each PDG 250 includes a subject PDC 246 and a corresponding set of one or more of the PDC which are adjacent to the subject PDC. For example, in some embodiments, a given instance of PDG 250 assumes that a first instance of PDC 146 is the subject PDC and that the first instance of PDC 146 is located in a row i (ith row) and a column i (ith column) of a layout diagram. The given instance of PDG 250 further assumes: a second instance of PDC 146 is located in a row i−1 ((i−1)th row) and in the ith column and so is regarded as being adjacent immediately above the first instance of PDC 146; a third instance of PDC 146 is located in a row i−1 ((i−1)th row) and in a column i+1 ((i+1)th column) and so is regarded as being adjacent immediately diagonally above and to the right of the first instance of PDC 146; a fourth instance of PDC 146 is located in the ith row and the (i+1)th column and so is regarded as being adjacent immediately to the right of the first instance of PDC 146; a fifth instance of PDC 146 is located in a row i+1 ((i+1)th row) and the (i+1)th column and so is regarded as being adjacent immediately diagonally below and to the right of the first instance of PDC 146; a sixth instance of PDC 146 is located in the (i+1)th row and in the ith column and so is regarded as being adjacent immediately below the first instance of PDC 146; a seventh instance of PDC 146 is located in the (i+1)th row and in an (i−1) column ((i−1)th column) and so is regarded as being adjacent immediately diagonally below and to the left of the first instance of PDC 146; an eighth instance of PDC 146 is located in the ith row and the (i−1)th column and so is regarded as being adjacent immediately to the left of the first instance of PDC 146; and a ninth instance of PDC 146 is located in the (i+1)th row and the (i−1)th column and so is regarded as being adjacent immediately diagonally above and to the left of the first instance of PDC 146.

In some embodiments, the subject PDCs of the corresponding instances of PDG 250 are corresponding instances of PDC 246. Accordingly, mappings between the instances of PDG 250 and the corresponding instances of IPC 248 are represented in FIG. 2 by a line therebetween. Recalling the mappings between instances of PDC 246 and IPC 248, it should also be understood that the subject PDCs of the corresponding instances of PDG 250 accordingly are mapped to corresponding instances of IPC 248.

Database 244 is further configured to store instances of corresponding intercell PC descriptions (EPC) 252. An EPC quantifies and describes the PC experienced by a corresponding layout cell which results from the electromagnetic and/or electrostatic interaction of external components, e.g., components within adjacent layout cells. In the acronym EPC, use of the letter E is suggestive of the sources of the EPC being external to the corresponding layout cell. Mappings between the instances of PDG 250 and the corresponding instances of EPC 252 are represented in FIG. 2 by a line therebetween. Together, the instances of PDG 250 provide a library of unit groups.

As an example of a group in a layout diagram which might correspond to an instance of PDG 250, consider the following given group of layout cells in floorplan diagram 100, wherein the subject cell of the given group is Unit-cell-A 102A in row 2 and column 4, and wherein the adjacent cells of the given group include: Unit-cell-B 102B in row 1 and columns 5-6; Unit-cell-C 102C in row 2 and column 6; Unit-cell-C 102C in row 3 and column 6; Unit-cell-A in row 3 and column 5; Unit-cell-A 102A in row 3 and column 4; Unit-cell-A 102A in row 2 and column 5; and Unit-cell-D 102D in row 1 and column 4. Continuing the example, where the given group in floorplan diagram 100 of FIG. 1 substantially matches a given instance of PDG 250 in database 244, the corresponding given instance of EPC 252 is substituted as the EPC for the given group of layout cells in floorplan diagram 100 rather than making a new discrete calculation of the EPC for the given group of layout cells in floorplan diagram 100 using the 3D field solver tool, thereby lessening computation loading and improving efficiency. Further continuing the example, in some embodiments, where a given instance of PDC 246 represents the subject PDC of the given instance of PDG 250, a corresponding given instance of IPC 248 is substituted as the IPC for the subject PDC rather than making a new discrete calculation of the IPC for the subject cell using the 3D field solver tool, thereby lessening computation loading and improving efficiency.

In some embodiments, each instance of PDG 250 has been subjected to the 3D field solver tool and so has a corresponding EPC 252. An EPC quantifies and describes the PC of a subject layout cell resulting from the external electromagnetic interaction of components with the external components of adjacent layout cells, i.e., external PC. Accordingly, each EPC 252 stored in database 244 quantifies and describes the external PC of the subject PDC resulting from the external electromagnetic and/or electrostatic interaction of components with the external components of one or more adjacent PDCs. Returning to the example of PDG 250 in which the subject cell of the given group is Unit-cell-A 102A in row 2 and column 4 of FIG. 1 (described above), the corresponding EPC describes the external PC resulting from the components of the adjacent cells of the given group, namely: Unit-cell-B 102B in row 1 and columns 5-6; Unit-cell-C 102C in row 2 and column 6; Unit-cell-C 102C in row 3 and column 6; Unit-cell-A in row 3 and column 5; Unit-cell-A 102A in row 3 and column 4; Unit-cell-A 102A in row 2 and column 5; and Unit-cell-D 102D in row 1 and column 4. In some embodiments, each EPCs 252 is formatted as a netlist (e.g., ".spef"). In some embodiments, database 244 also stores layout diagrams 254. In some embodiments, database 244 is a layout versus schematic (LVS) database.

FIG. 3A-FIG. 3E is a flowchart 300 that describes procedures for IPCs and EPCs for corresponding layout cells in a layout diagram, in accordance with some embodiments.

Flowchart 300 includes blocks 302-334, which are implemented as described below. Examples of layout cells and a layout diagram to which the blocks 302-334 in flowchart 300 are applied are layout cells 102A, 102B, 102C, 102D, 102E of floorplan diagram 100. The procedures in flowchart 300 are implemented by a computer device executing computer executable code, such as the EDA system 200 executing the computer executable code 206 described above with respect to FIG. 2.

Figure 3A:
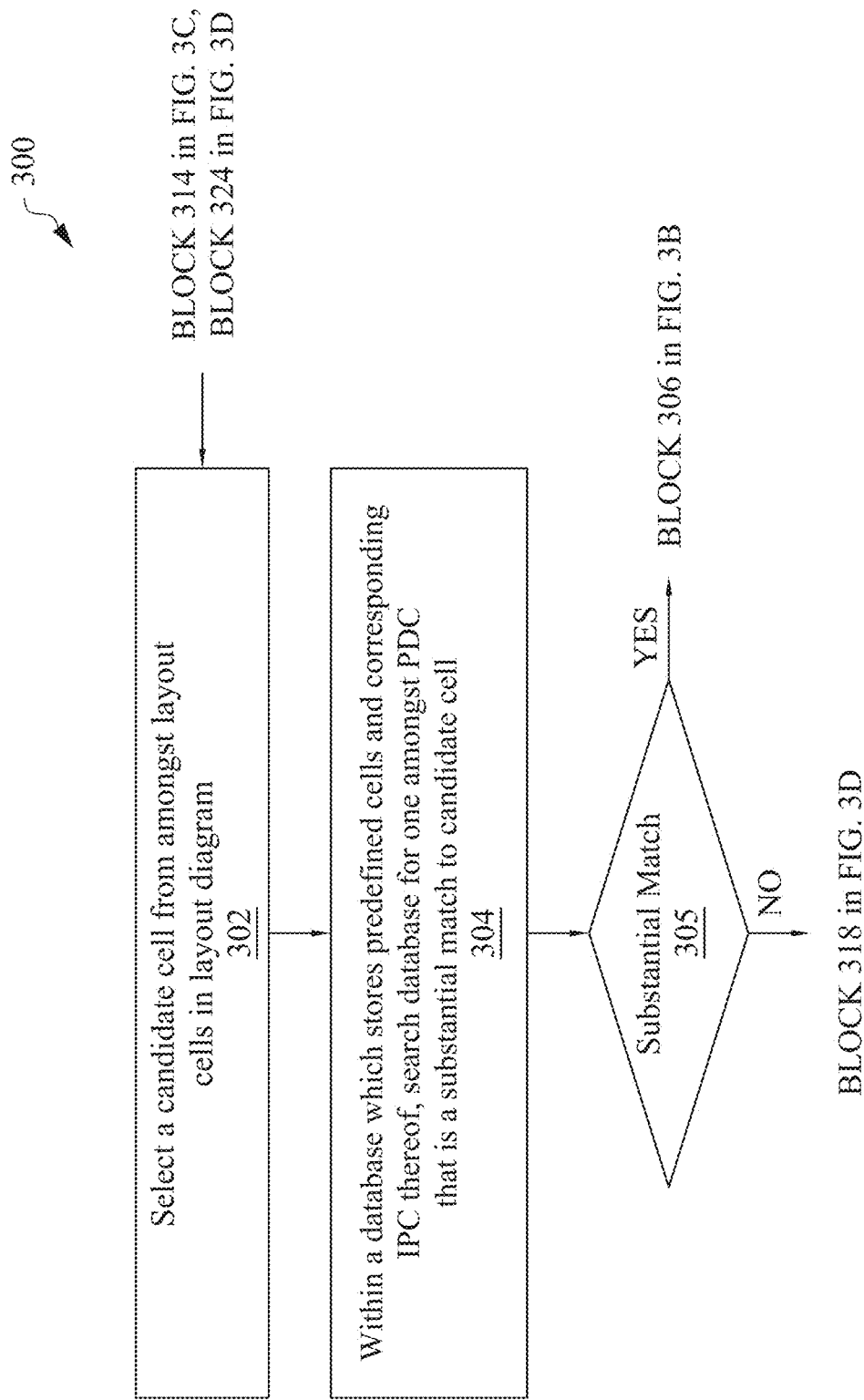

In FIG. 3A at block 302, a candidate cell is selected from amongst the layout cells in the layout diagram. In some embodiments, the particular cell that is selected depends on the particular iteration technique used to iterate through the layout cells in the layout diagram. In some embodiments, the computer device iterates through the layout cells based on position. In some embodiments, the computer device iterates through the layout cells from a starting location to an ending location.

Each layout cell 102A, 102B, 102C, 102D, 102E in floorplan diagram 100 has a location. For layout cells 102A, 102B, 102C, 102D within the boundaries 106, 108, 110, 112, the location of layout cells 102A, 102B, 102C, 102D is identified by the corresponding row number (i.e., row 1-row 5) and the corresponding column number (varies based on the row number). The location of the peripheral layout cells 102E are treated as special cases. In one example, with respect to floorplan diagram 100 in FIG. 1, the computer device starts by selecting layout cell 102B in row 1 and columns 2-3, within the boundaries 106, 108, 110, 112. In this particular example, the procedure is assumed to begin within the boundaries 106, 108, 110, 112. Within the boundaries 106, 108, 110, 112, the procedure iterates through each of the layout cells in a particular row from left to right with respect to the X-axis. For example, with respect to row 1, the procedure starts at layout cell 102B in row 1 and columns 2-3, then proceeds to layout cell 102D in row 1 and column 4, and then proceeds to layout cell 102B in row 1 and columns 5-6. After iterating through all of the layout cells in a particular row, the procedure progresses to the next row from top to bottom. As such, the procedure moves to row 2 and iterate from left to right through layout cell 102C in column 2, cells 102A in columns 3 then 4 then 5, and then cell 102C in column 6. The procedure proceeds similarly for each of the rows 3, 4, 5. In some embodiments, the procedure then proceeds to layout cell 102E in row 0 and column 4, then to cell 102E in rows 2-3 and column 1, then to cell 102E in rows 2-3 and column 7, and then to cell 102E in row 6 and column 4. Accordingly, it is assumed that the first iteration of block 302 selects layout cell 102B in row 1 and columns 2-3 as the candidate cell. From block 302, flow proceeds to block 304.

At block 304, within a database which stores PDCs and corresponding IPCs thereof, a search is made for one amongst the PDCs that is a substantial match for the candidate cell. An example of the database is database 244 of FIG. 2, or the like. Examples of the PDCs include instances of PDC 246 in database 244, or the like. In some embodiments, pattern recognition algorithms are used to determine whether the candidate cell substantially matches any of the PDCs stored in the database. For the first iteration described above in which the candidate cell is layout cell 102B in row 1 and columns 2-3, database 244 is searched for one amongst the instances of PDC 246 that substantially matches layout cell 102B in row 1 and columns 2-3. From block 304, flow proceeds to block 305.

At block 305, which is a decision block, it is determined if a substantial match has been found. If so, i.e., when a substantial match is found, then flow proceeds along the YES-branch to block 306 in FIG. 3B. If not, i.e., when a substantial match is not found, then the flow proceeds along the NO-branch to block 318 in FIG. 3D. Assuming that a substantial match is found, then flow proceeds along the YES-branch of block 314 to block 306.

Figure 3B:
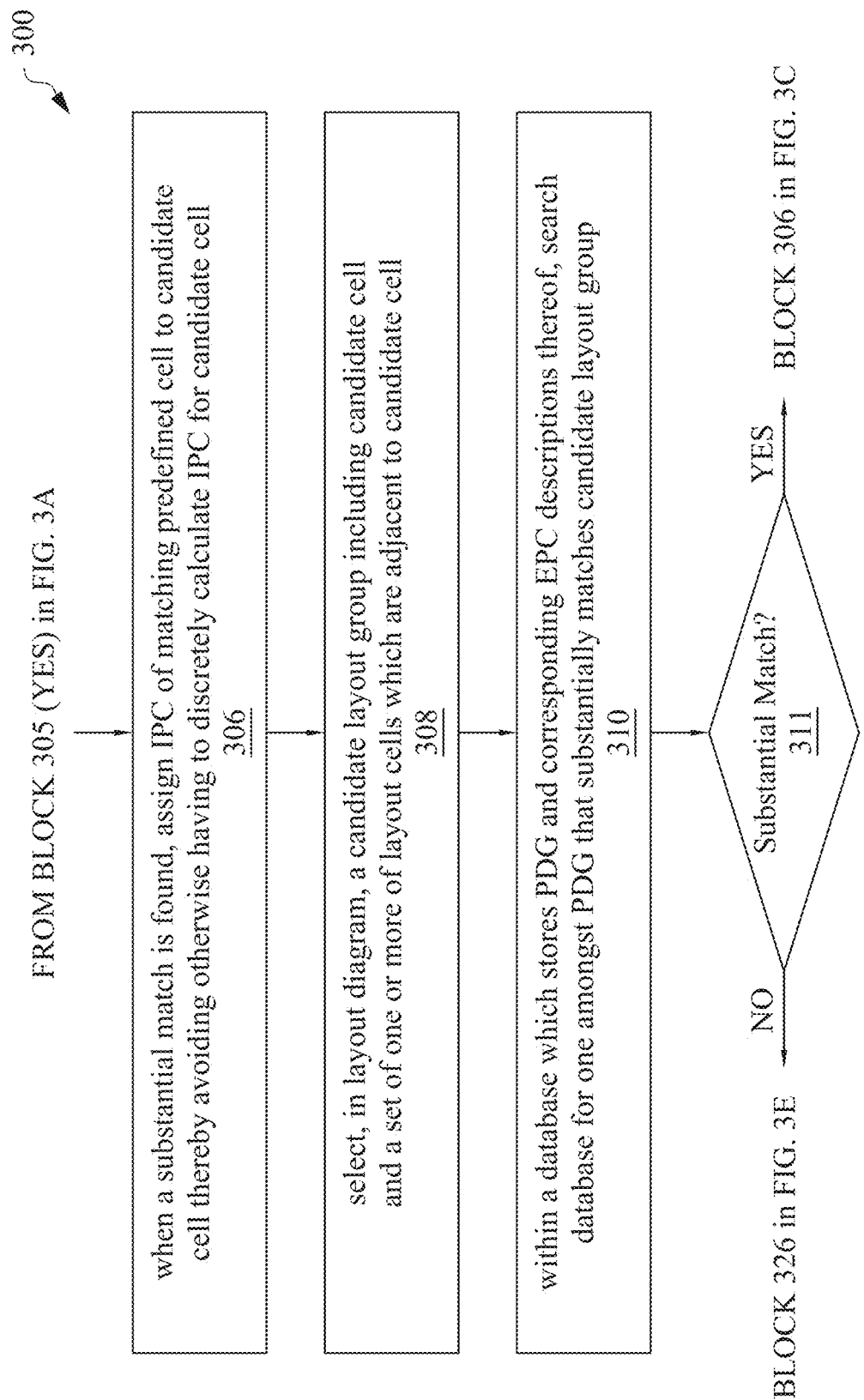

At block 306 of FIG. 3B, the IPC of the matching PDC is assigned to the candidate cell. In the first iteration described above, the instance of IPC 248 corresponding to the instance of PDC 246 that substantially matches layout cell 102B in row 1 and columns 2-3 is assigned to the candidate cell, thereby avoiding otherwise having to discretely calculate a PC description for the candidate cell. From block 306, flow proceeds to block 308.

At block 308, a candidate layout group is selected that includes the candidate cell and a set of one or more of the layout cells which are adjacent to the candidate cell. In some embodiments, the adjacency relationship between the candidate cell and the layout cells adjacent to the candidate cell varies depending on the EPC accuracy requirements and the amount of computational resources available. In some embodiments, a window size for the candidate layout group defines how far from the selected cell an adjacent cell can be and still be part of the candidate layout group.

Regarding block 308, in some embodiments, the window size is denominated in units of substantially contiguous cells. For example, if the window size is selected to be 1, then only layout cells that are a distance of 1 substantially contiguous cell away from the candidate cell are included in the candidate layout group. As another example, if the window size is selected to be 2 substantially contiguous cells, then layout cells that are a distance of 2 substantially contiguous cells or fewer from the candidate cell are included in the cell layout group. Continuing with the example of the first iteration discussed above in which the candidate cell is layout cell 102B in row 1 and columns 2-3, if a window size of 2 is selected, then layout cell 102E in row 0 and column 4, layout cell 102D in row 1 and column 4, layout cell 102C in row 2 and column 2, and layout cell 102A in row 2 and column 3, and layout cell 102A in row 2 and column 4 would be included in the candidate layout group.

Also regarding block 308 albeit alternatively, continuing with the example of the first iteration discussed above in which the candidate cell is layout cell 102B in row 1 and columns 2-3, instead if a window size of 2 is selected, then: the adjacent layout cells are included, namely layout cell 102E in row 0 and column 4, layout cell 102D in row 1 and column 4, layout cell 102C in row 2 and column 2, layout cell 102A in row 2 and column 3, layout cell 102A in row 2 and column 4; and additional layout cells are included, namely layout cell 102B in row 1 and columns 5-6, layout cell 102A in row 2 and column 5, layout cell 102E in row 3 and column 1, layout cell 102C in row 3 and column 2, layout cell 102A in row 3 and column 3, layout cell 102A in row 3 and column 4, and layout cell 102A in row 3 and column 5. From block 308, flow proceeds to block 310.

At block 310, within a database which stores PDG and corresponding EPCs thereof, a search is made for one amongst the PDGs that substantially matches the candidate layout group. Continuing with the example of the first iteration discussed above in which the candidate cell is layout cell 102B in row 1 and columns 2-3, and assuming a window size of 1, database 244 is searched for one among the instances of PDG 250 that has a subject instance of PDC 246 which substantially matches layout cell 102B in row 1 and columns 2-3 and that has adjacent instances of PDC 246 that correspondingly substantially match layout cell 102E in row 0 and column 4, layout cell 102D in row 1 and column 4, layout cell 102C in row 2 and column 2, and layout cell 102A in row 2 and column 3, and layout cell 102A in row 2 and column 4. From block 310, flow proceeds to block 311.

At block 311, which is a decision block, it is determined if a substantial match of the candidate layout group has been found. If so, i.e., when a substantial match is found, then flow proceeds along the YES-branch to block 312 in FIG. 3C. If not, i.e., when a substantial match is not found, then flow proceeds along the NO-branch to block 326 in FIG. 3E. Assuming that a substantial match is found, then flow proceeds along the YES-branch of block 311 to block 312.

Figure 3C:
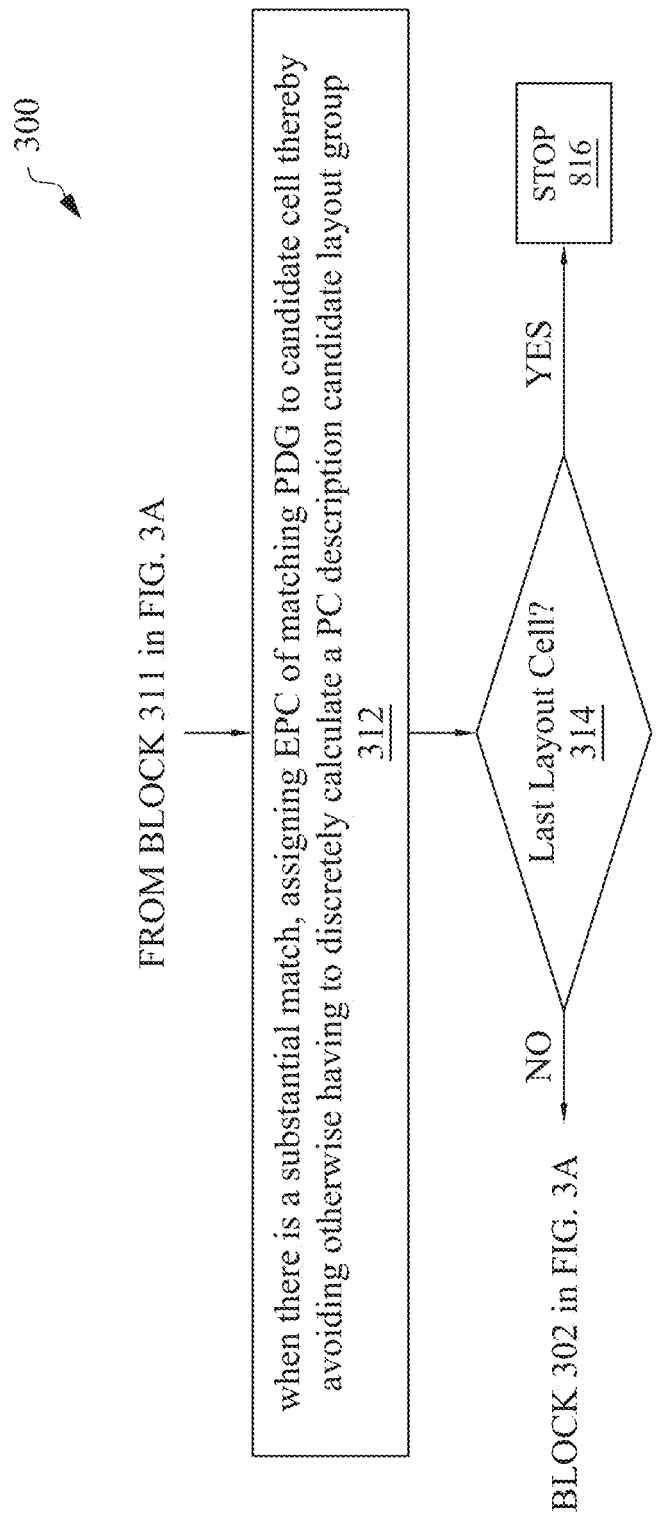

At block 312 of FIG. 3C, the EPC of the matching PDG is assigned to the candidate cell. Continuing with the example of the first iteration discussed above in which the candidate cell is layout cell 102B in row 1 and columns 2-3, the instance of EPC 252 corresponding to the instance of PDG 250 that matches layout cell 102B in row 1 and columns 2-3 and that has adjacent instances of PDC 246 that correspondingly substantially match layout cell 102E in row 0 and column 4, layout cell 102D in row 1 and column 4, layout cell 102C in row 2 and column 2, and layout cell 102A in row 2 and column 3, and layout cell 102A in row 2 and column 4 is assigned to the candidate cell, thereby avoiding otherwise having to discretely calculate an EPC for the candidate cell. From block 312, flow proceeds to block 314.

At block 314, which is a decision block, it is determined in the candidate layout cell is the last layout cell in the layout diagram. Is so, i.e., if the candidate cells is the last cell in the layout diagram, then flow proceeds along the YES-branch to block 316 at which flow stops. If not, i.e., if the candidate cells is not the last layout cell in the layout diagram, then the procedure iterates to the next candidate cell with flow proceeding along the NO-branch to block 302 so that procedure can begin again for the next candidate cell. In this manner, the procedure incrementally progresses through each of the layout cells listed in a roster, which lists each of the layout cells in accordance with some embodiments. In the example given above, the instances of layout cells 102A, 102B, 102C, 102D, 102E are included in a roster which is organized by location in floorplan diagram 100. Continuing the example of the first iteration provided above, for the second iteration, the procedure would proceed along the NO-branch of block 314 to block 302, where layout cell 102D in row 1 and column 4 becomes the candidate cell.

Referring again to block 305 in FIG. 3A, assuming that a substantial match is not found for the candidate cell, then flow proceeds along the NO-branch of block 305 to block 318 in FIG. 3D. Continuing with the example of the first iteration discussed above in which the candidate cell is layout cell 102B in row 1 and columns 2-3, assuming that none of the instances of PDC 246 match the candidate cell, then flow proceeds along the NO-branch of block 305 to block 318.

At block 318, the candidate cell is subjected to a 3D field solver tool which discretely calculates an IPC for the candidate cell. It is to be recalled that flow has reached block 318 after having proceeded along the NO-branch of block 305 to block 318 because no instance of PDC 246 in database 244 substantially matches the candidate cell. In some embodiments, the 3D field solver tool is configured to solve Laplace's equation in order to obtain the IPC for the candidate cell. In the first iteration described above in which the candidate cell is layout cell 102B in row 1 and columns 2-3, and where it is assumed that none of the instances of PDC 246 substantially matches the candidate cell, the 3D field solver tool discretely calculates an IPC for the candidate cell. From block 318, flow proceeds to block 320.

At block 320, the IPC (which was discretely calculated in block 318) is assigned to the candidate cell. From block 320, flow proceeds to block 322.

At block 322, the database is appended to include: the candidate cell as a new instance of PDC 246 and the IPC for the candidate cell as the corresponding IPC for the new instance of PDC 246. In the first iteration described above in which the candidate cell is layout cell 102B in row 1 and columns 2-3, and where it is assumed that none of the instances of PDC 246 substantially matches the candidate cell, database 244 is appended to include layout cell 102B in row 1 and columns 2-3 as a new instance of PDC 246 and the calculated IPC for layout cell 102B in row 1 and columns 2-3 as the corresponding instance of IPC 248 for the new instance of PDC 246. In this manner, going forward, if a subsequent candidate cell in either floorplan diagram 100 or in another layout diagram substantially matches layout cell 102B in row 1 and columns 2-3, then it becomes unnecessary to make a discrete calculation for IPC using the 3D field solver tool. As such, work already done by the 3D field solver tool is stored and reused for the subsequent candidate cell. From block 322, flow proceeds to block 324.

At block 324, a candidate layout group having a central cell is selected, wherein the central cell is the candidate cell. It is to be recalled that flow reaches block 324 by proceeding along the NO-branch of block 305 through blocks 320-322, which reflects that no substantial match for the candidate cell among the instances of PDC 246 in database 244. As a result, there is no instance of PDG 250 in database 244 that substantially matches the candidate layout group for which the central cell is the candidate cell.

Accordingly, at block 324, not only is the candidate cell selected as the central cell of the candidate layout group, but a first set of one or more of the layout cells which are adjacent to the candidate cell, in the same manner described above with respect to block 308. For example, continuing with the example of the first iteration described above in which the candidate cell is layout cell 102B in row 1 and columns 2-3, if a window size of 1 is assumed, then the central cell of the candidate layout group is the candidate cell, i.e., layout cell 102B in row 1 and columns 2-3, and the candidate layout group further includes layout cell 102E in row 0 and column 4, layout cell 102D in row 1 and column 4, layout cell 102C in row 2 and column 2, and layout cell 102A in row 2 and column 3, and layout cell 102A in row 2 and column 4. However, rather making a futile search of database 244 for one amongst the instances of PDG 250 that substantially matches the candidate layout group, the search being futile because there is no substantial match for the candidate cell among the instances of PDC 246 in database 244 (as determined in block 305), instead flow proceeds to block 326 in FIG. 3E.

Figure 3E:
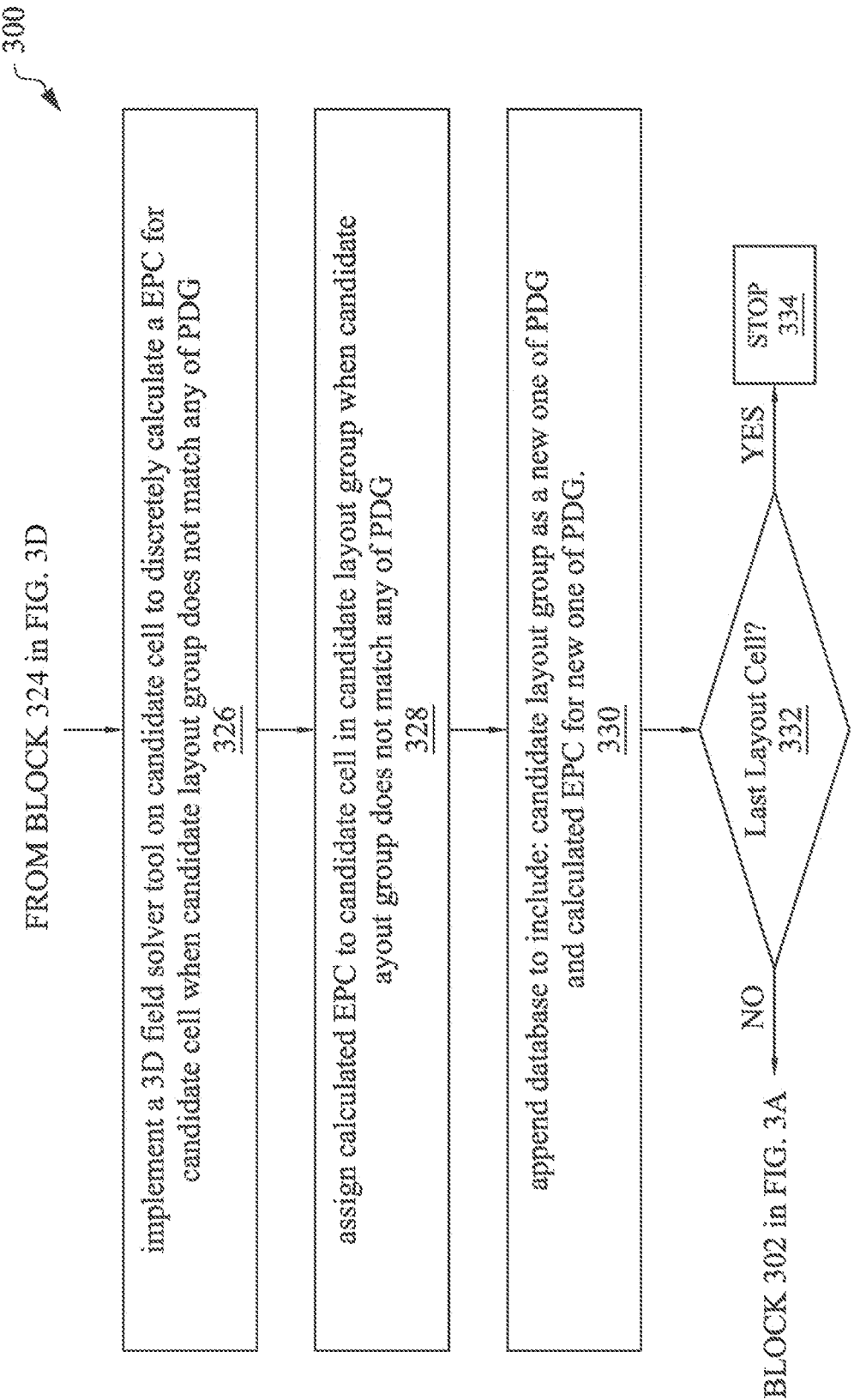

At block 326 of FIG. 3E, the candidate cell is subjected to the 3D field solver tool which discretely calculates an EPC for the candidate cell. It is to be recalled that flow has reached block 326 after having proceeded along the NO-branch of block 305 to block 318 because no instance of PDC 246 in database 244 substantially matches the candidate cell, and thus no instance of PDG 250 in database 244 substantially matches the candidate layout group for which the central cell is the candidate cell. In some embodiments, the 3D field solver tool is configured to solve Laplace's equation in order to obtain the EPC for the candidate cell relative to the candidate layout group. Continuing with the example of the first iteration discussed above in which the candidate cell is layout cell 102B in row 1 and columns 2-3, if a window size of 1 is assumed, then the 3D field solver tool discretely calculates an EPC for the candidate cell relative to the candidate layout group which includes the candidate cell, i.e., the layout cell 102B in row 1 and columns 2-3, as the central cell, and which further includes layout cell 102E in row 0 and column 4, layout cell 102D in row 1 and column 4, layout cell 102C in row 2 and column 2, and layout cell 102A in row 2 and column 3, and layout cell 102A in row 2 and column 4. As window size increases, EPC becomes more accurate, however correspondingly more computational resources and time are required to discretely calculate the EPC. Also, in some embodiments, window size increases, the probability of finding a matching PDG 250 in database 244 decreases. From block 326, flow proceeds to block 328.

At block 328, the EPC (which was discretely calculated in block 326) assigned to the candidate layout group which includes the candidate cell as the central cell thereof. From block 328, flow proceeds to block 330. In this manner, going forward, if a subsequent candidate layout group in either floorplan diagram 100 or in another layout diagram substantially matches the candidate layout group which includes the candidate cell, i.e., the layout cell 102B in row 1 and columns 2-3, as the central cell, and which further includes layout cell 102E in row 0 and column 4, layout cell 102D in row 1 and column 4, layout cell 102C in row 2 and column 2, and layout cell 102A in row 2 and column 3, and layout cell 102A in row 2 and column 4, then it becomes unnecessary to make a discrete calculation for EPC using the 3D field solver tool. As such, work already done by the 3D field solver tool is stored and reused again for the subsequent candidate cell. Flow proceeds from block 332 to block 330 to block 332, the latter having been discussed above.

Referring again to decision block 311 in FIG. 3B, when the candidate layout group does not match an instance of PDG 250 in database 244, the flow proceeds along the NO-branch of block 311 to block 326 in FIG. 3E, the latter having been discussed above.

Figure 4A:
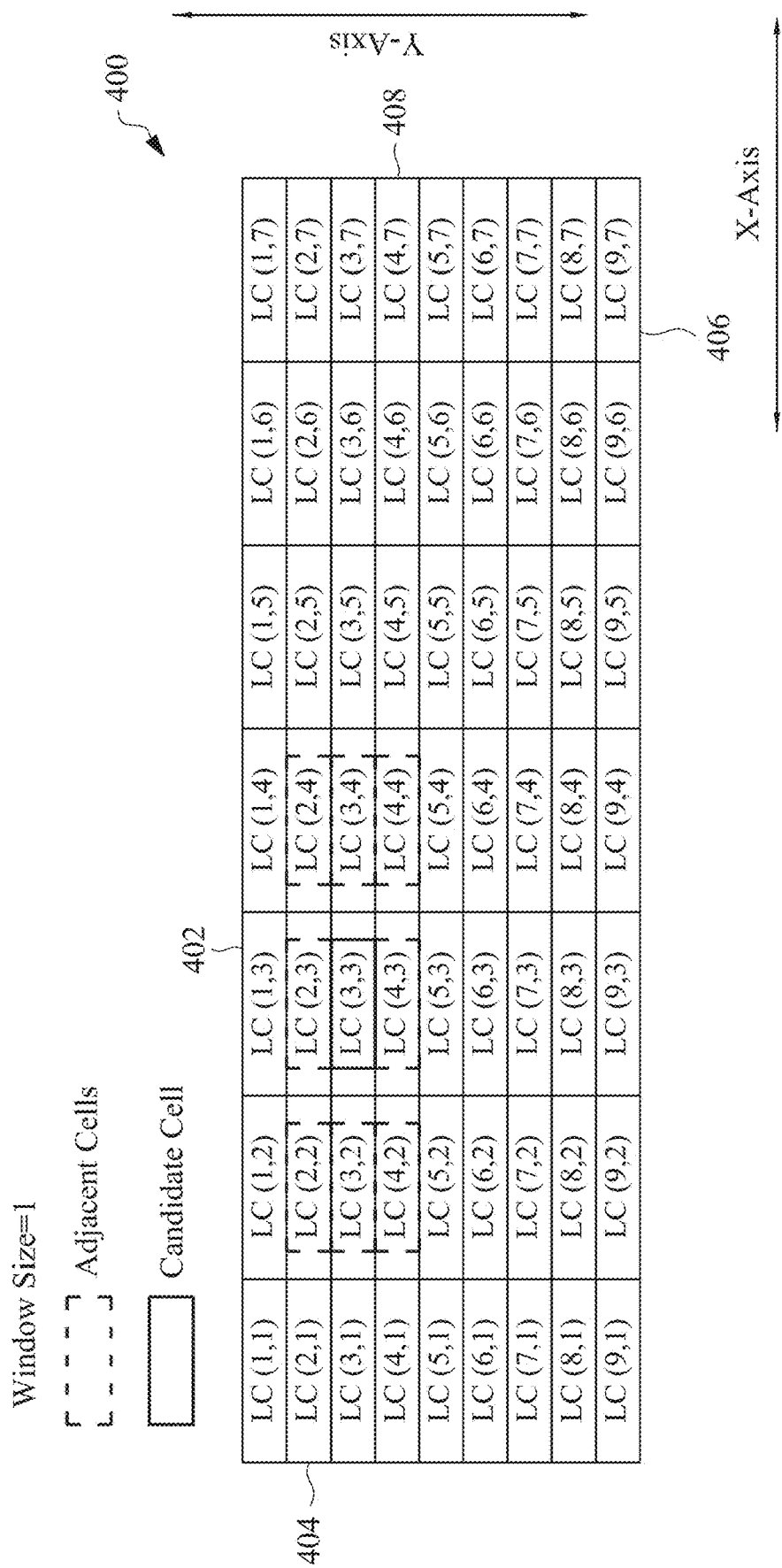
FIGS. 4A-4C are simplified layout diagrams 400 of a semiconductor device, in accordance with some embodiments.
Figure 4B:
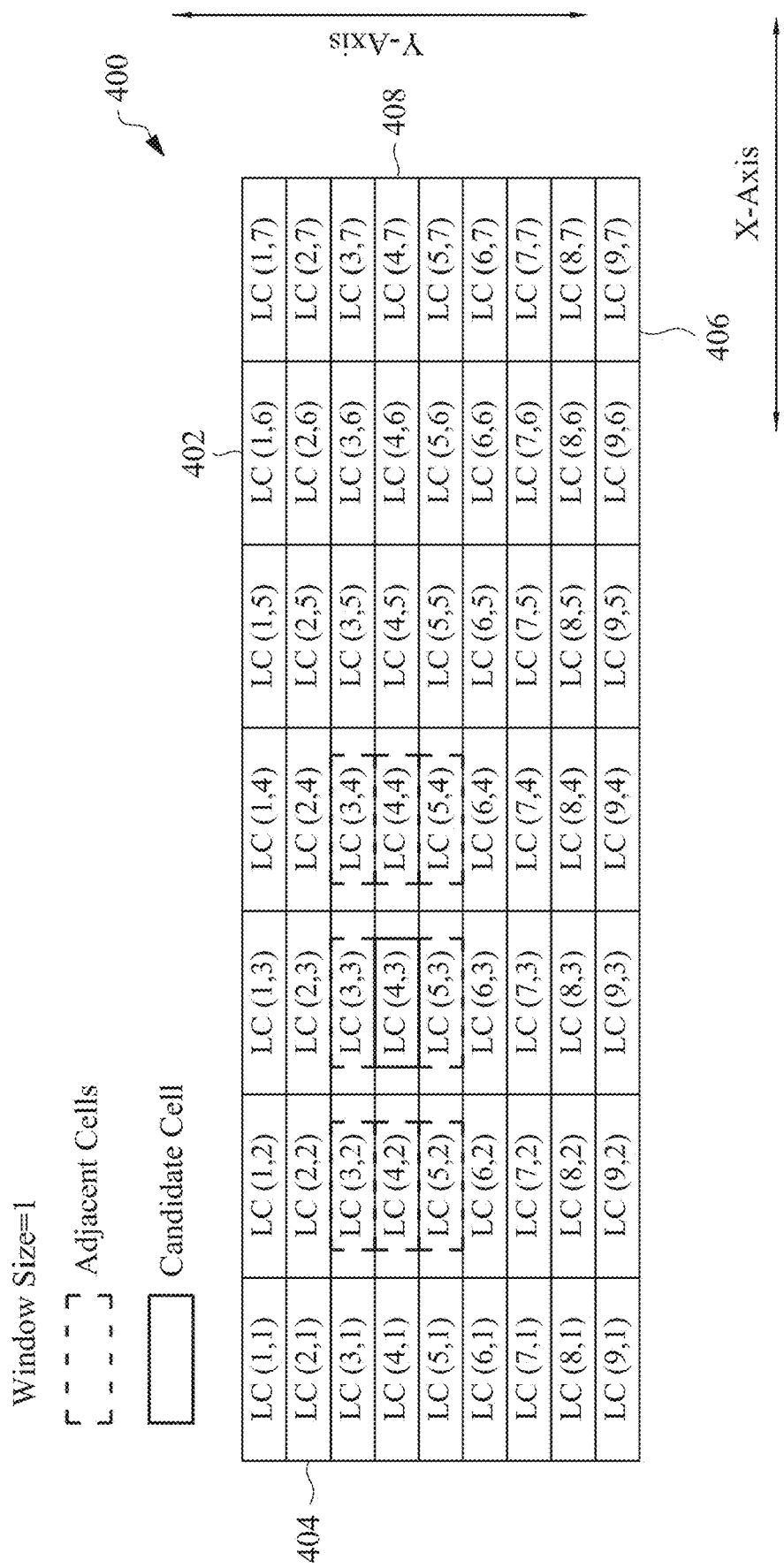
Figure 4C:
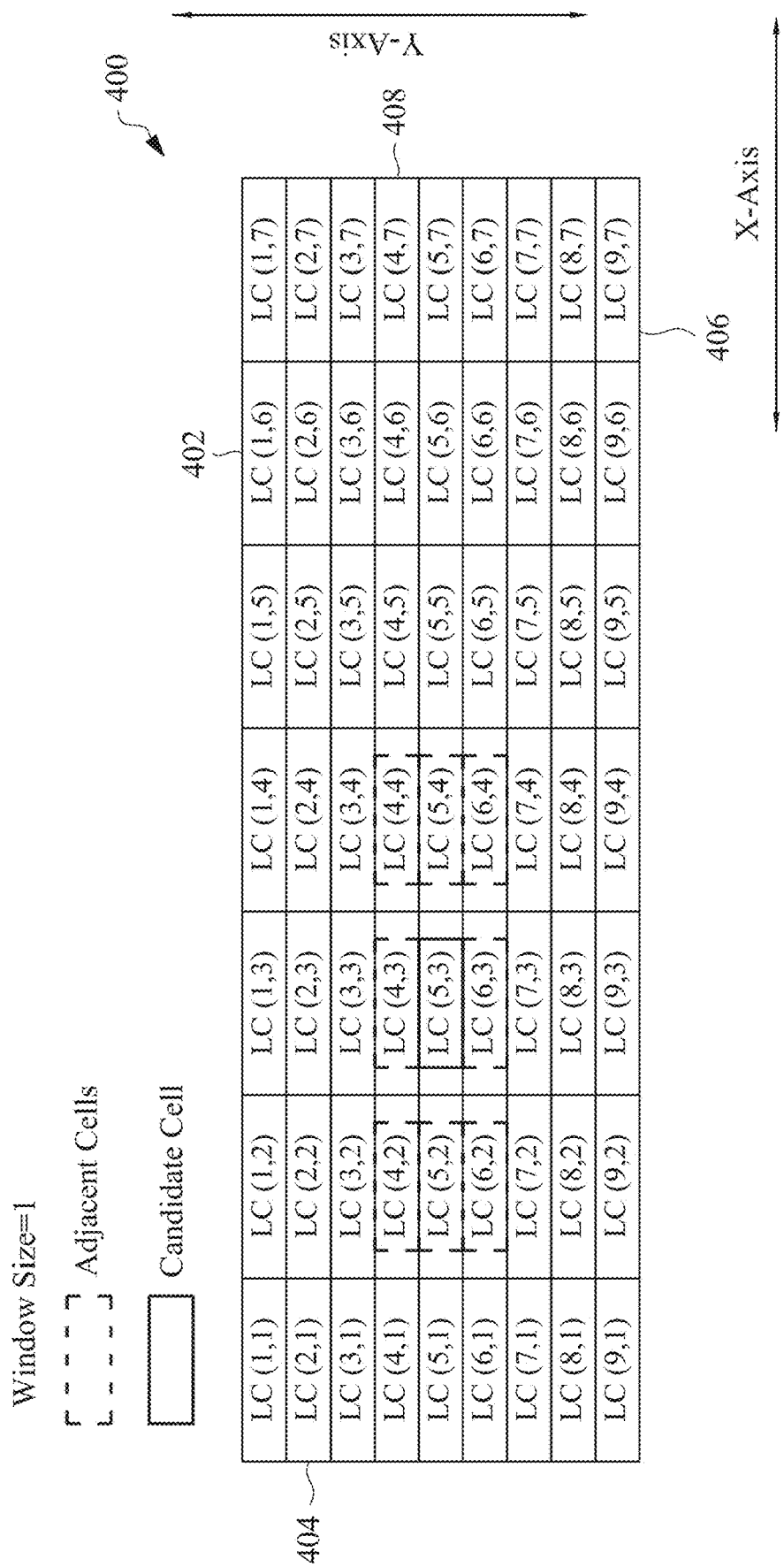

FIGS. 4A-4C are simplified layout diagrams 400 of a semiconductor device, in accordance with some embodiments.

FIGS. 4A-4C illustrate one example of iterating through the layout cells in a layout diagram to determine the IPC and the EPC of the layout cells, e.g., according to a method such as in FIGS. 3A-3E, or the like. In FIGS. 4A-4C, each of the layout cells is identified by the identifier LC and two parenthetical numbers, i.e., two numbers enclosed with parentheses, e.g., LC (3,3), where the first number is the row position and the second number is the column position.

In FIGS. 4A-4C, layout cell LC are provided within a top boundary 402, a left boundary 404, a right boundary 406, and a bottom boundary 408. In the example of FIGS. 4A-4C, the layout diagram 400 has nine rows 1-9 and seven columns 1-7. In other embodiments, layout diagram 400 includes more or less than nine rows and/or more or less than seven columns. Also, in FIGS. 4A-4C, each row has the same number of layout cells LC and each column has the same number of layout cells LC. However, in other embodiments, two or more rows have different numbers of LCs and/or two or more columns have a different number of LCs.

For convenience, the direction in which the rows extend is parallel to X-axis and the direction in which the columns extend is parallel to the Y axis. For simplicity of illustration and discussion, the board is shown for three different iterations, namely corresponding FIGS. 4A-4C. For simplicity of illustration and discussion, the window size in FIGS. 4A-4C is a distance of 1. For purposes of the discussion below, iteration progresses through the layout diagram 400 by starting at the left most column (i.e., column 1) and the top most row (i.e., row 1) and then progressing down the column in the Y-direction until the last row (i.e., row 9) in the column is reached. The next column would be the column immediately to the right of the previous column where the iteration would then again progress through the column from top to bottom. The iteration would continue until the last row (i.e. row 7) is reached. However, it should be noted that any technique for iterating through the layout cells LC in the layout diagram 400 can be utilized.

In FIG. 4A, the candidate cell is layout cell LC (3,3). Layout cell LC (3,3) is selected for convenience with regard to this explanation. The candidate layout group is the candidate layout cell LC (3,3) with adjacent layout cell LC (2,2), layout cell LC (2,3), layout cell LC (2,4), layout cell LC (3,2), layout cell LC (3,4), layout cell LC (4,2), layout cell LC (4,3) and layout cell LC (4,4). In some embodiments, a computer device (e.g., EDA system 200 in FIG. 2) implements blocks 302-334 in FIGS. 3A-3E to determine the IPC and the EPC of layout cell LC (3,3).

The computer device then progresses to the next candidate cell. In FIG. 4B, the candidate cell is layout cell LC (4,3). The candidate layout group is the candidate layout cell LC (4,3) with adjacent layout cell LC (3,2), layout cell LC (3,3), layout cell LC (3,4), layout cell LC (4,2), layout cell LC (4,4), layout cell LC (5,2), layout cell LC (5,3), layout cell LC (5,4). The computer device (e.g., EDA system 200 in FIG. 2) implements blocks 302-334 in FIGS. 3A-3E to determine the IPC and the EPC of layout cell LC (4,3).

The computer device then progresses to the next candidate cell. In FIG. 4C, the candidate cell is layout cell LC (5,3). The candidate layout group is the candidate layout cell LC (5,3) with adjacent layout cell LC (4,2), layout cell LC (4,3), layout cell LC (4,4), layout cell LC (5,2), layout cell LC (5,4), layout cell LC (6,2), layout cell LC (6,3), layout cell LC (6,4). The computer device (e.g., EDA system 200 in FIG. 2) implements blocks 302-334 in FIGS. 3A-3E to determine the IPC and the EPC of layout cell LC (5,3).

The computer device progresses through each of the layout cells LC in this manner to determine the IPC and the EPC of the layout cells LC. However, with respect to the EPC, note that only the layout cells that have a distance of 1 are considered since the window size is 1. This makes it more likely that matches for candidate layout groups will be found in the database and also reduce the time required to discretely calculate the EPC with the 3D field solver. However, the EPC calculation will be less accurate since the EPC is effected by layout cells EPC that are further away (although layout cells LC that are further away have a smaller effect on EPC).

Figure 5A:
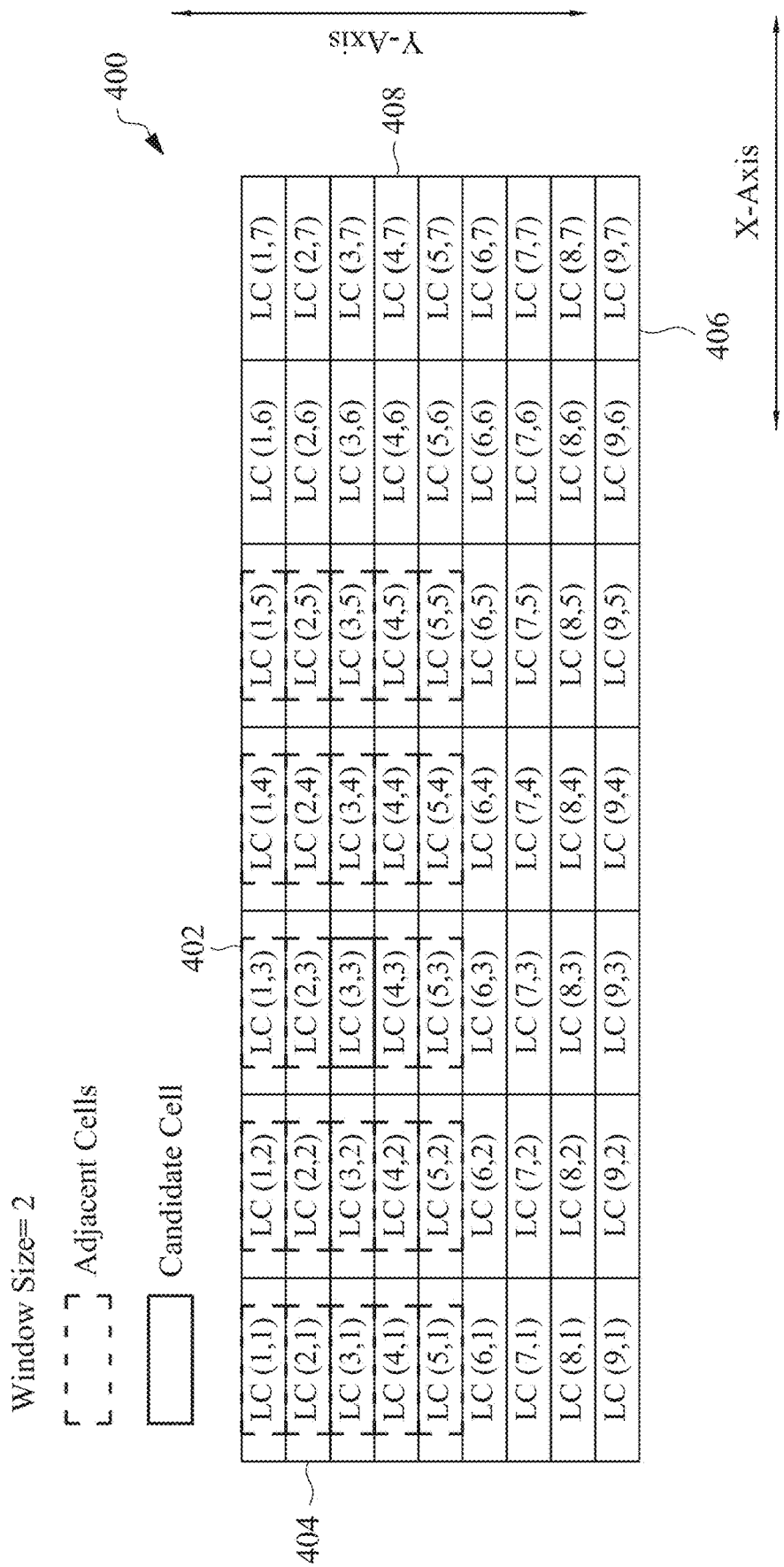
FIGS. 5A-5C are simplified layout diagrams 400 of the same semiconductor device described above with respect to FIGS. 4A-4C, in accordance with some embodiments.
Figure 5B:
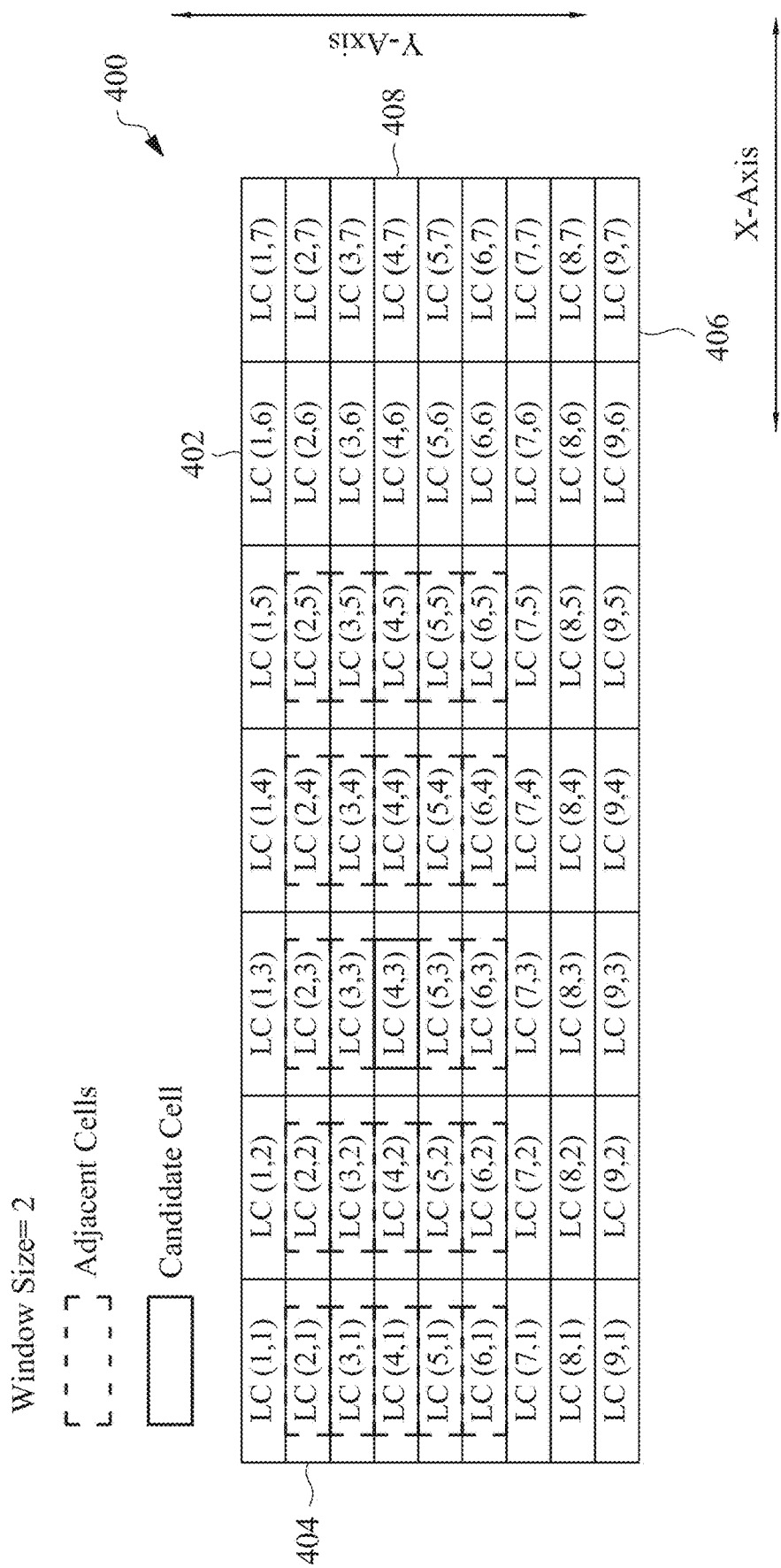
Figure 5C:
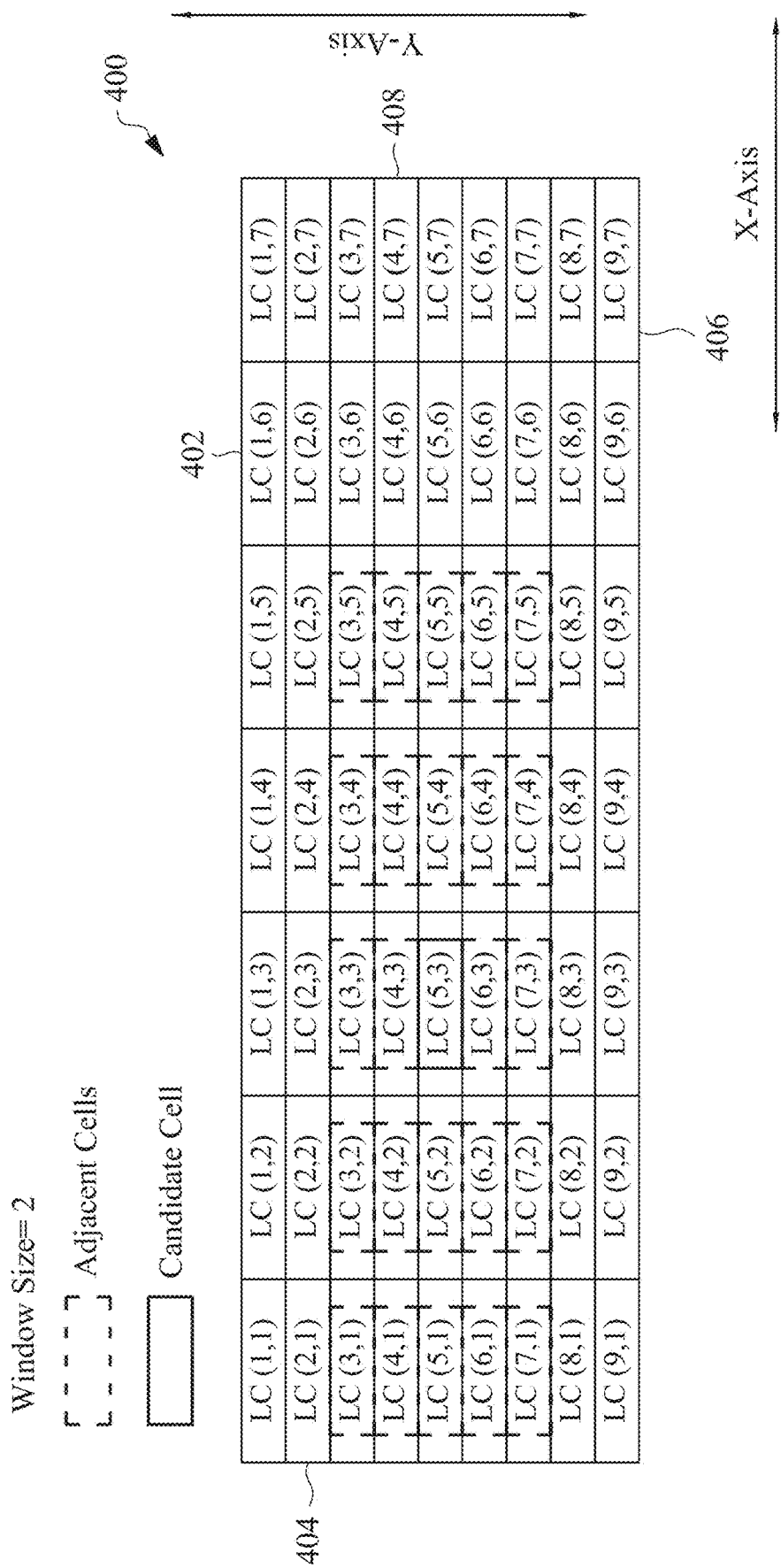

FIGS. 5A-5C are simplified layout diagrams 400 of a semiconductor device, in accordance with some embodiments.

More particularly, FIGS. 5A-5C are simplified layout diagrams 400 of the same semiconductor device described above with respect to FIGS. 4A-4C, albeit in the context of a window size having a distance of 2, whereas the window size in FIGS. 4A-4C has a distance of 1. In FIGS. 5A-5C, the computer device progresses through the layout diagram in the same order described above with respect to FIGS. 4A-4C. The window size in FIG. 5A-5C is a distance of 2. In FIG. 5A-5C, the computer device determines the IPC and the EPC of the layout cells, e.g., according to a method such as in FIGS. 3A-3E, or the like.

In FIG. 5A, the candidate cell is layout cell LC (3,3). Layout cell LC (3,3) was selected for convenience with regard to this explanation. The candidate layout group is the candidate layout cell LC (3,3) with adjacent layout cell LC (1,1), layout cell LC (1,2), layout cell LC (1,3), layout cell LC (1,4), layout cell LC (1,5), layout cell LC (2,1), layout cell LC (2,2), layout cell LC (2,3), layout cell LC (2,4), layout cell LC (2,5), layout cell LC (3,1), layout cell LC (3,2), layout cell LC (3,4), layout cell LC (3,5), layout cell LC (4,1), layout cell LC (4,2), layout cell LC (4,3), layout cell LC (4,4), layout cell LC (4,5), layout cell LC (5,1), layout cell LC (5,2), layout cell LC (5,3), layout cell LC (5,4) and layout cell LC (5,5). The computer device (e.g., EDA system 200 in FIG. 2) implements blocks 302-334 in FIGS. 3A-3E to determine the IPC and the EPC of layout cell LC (3,3).

The computer device then progresses to the next candidate cell. In FIG. 5B, the candidate cell is layout cell LC (4,3). The candidate layout group is the candidate layout cell LC (4,3) with adjacent layout cell LC (2,1), layout cell LC (2,2), layout cell LC (2,3), layout cell LC (2,4), layout cell LC (2,5), layout cell LC (3,1), layout cell LC (3,2), layout cell LC (3,3), layout cell LC (3,4), layout cell LC (3,5), layout cell LC (4,1), layout cell LC (4,2), layout cell LC (4,4), layout cell LC (4,5), layout cell LC (5,1), layout cell LC (5,2), layout cell LC (5,3), layout cell LC (5,4), layout cell LC (5,5), layout cell LC (6,1), layout cell LC (6,2), layout cell LC (6,3), layout cell LC (6,4) and layout cell LC (6,5). The computer device (e.g., EDA system 200 in FIG. 2) implements blocks 302-334 in FIGS. 3A-3E to determine the IPC and the EPC of layout cell LC (4,3).

The computer device then progresses to the next candidate cell. In FIG. 5C, the candidate cell is layout cell LC (5,3). The candidate layout group is the candidate layout cell LC (5,3) with adjacent layout cell LC (3,1), layout cell LC (3,2), layout cell LC (3,3), layout cell LC (3,4), layout cell LC (3,5), layout cell LC (4,1), layout cell LC (4,2), layout cell LC (4,3), layout cell LC (4,4), layout cell LC (4,5), layout cell LC (5,1), layout cell LC (5,2), layout cell LC (5,4), layout cell LC (5,5), layout cell LC (6,1), layout cell LC (6,2), layout cell LC (6,3), layout cell LC (6,4), layout cell LC (6,5), layout cell LC (7,1), layout cell LC (7,2), layout cell LC (7,3), layout cell LC (7,4) and layout cell LC (7,5). The computer device (e.g., EDA system 200 in FIG. 2) implements blocks 302-334 in FIGS. 3A-3E to determine the IPC and the EPC of layout cell LC (5,3).

The computer device progresses through each of the layout cells LC in this manner to determine the IPC and the EPC of the layout cells LC. In this case, the EPCs determined with respect to FIGS. 5A-5C are more accurate than the EPCs determined in FIGS. 4A-4C where the window size is 1. This makes it more likely that matches for candidate layout groups will be found in the database and also reduce the time required to discretely calculate the EPC with the 3D field solver. However, the EPC calculation will be less accurate since the EPC is effected by layout cells EPC that are further away (although layout cells LC that are further away have a smaller effect on EPC).

Figure 6:
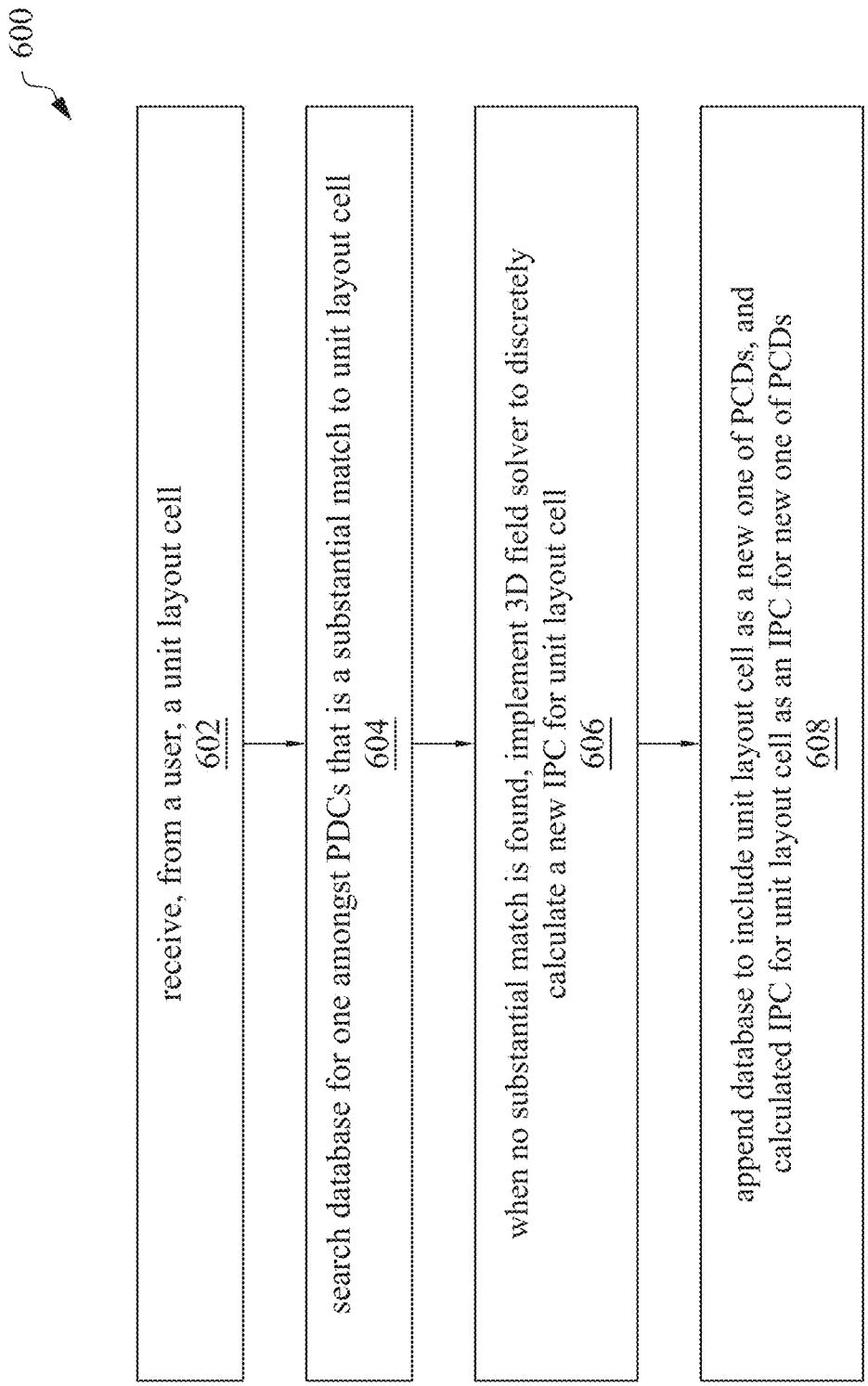
FIG. 6 is a flow diagram 600 of procedures that are implemented prior to selecting a candidate cell, in accordance with some embodiments.

FIG. 6 is a flow diagram 600 of procedures that are implemented prior to selecting a candidate cell, in accordance with some embodiments.

In some embodiments, a user knows that a particular unit layout cell will appear repeatedly throughout a layout diagram. For example, if the user knows that the layout diagram includes SRAM memory with a new configuration of the SRAM memory cells, the user knows that the new version of the SRAM memory cells appear repeatedly throughout layout diagrams of SRAM memory circuits. Accordingly, the user will want to ensure that assigning a PC description to these SRAM memory cells with the computer device (e.g., the EDA system 200) operates as efficiently as possible.

At block 602, the computer device receives a unit layout cell from the user. For example, the EDA system 200 receives a unit layout cell of the new SRAM memory cell. At block 604, the computer device searches the database for one amongst the PDC that is a substantial match to the unit layout cell. For example, the EDA system 200 searches database 244 to determine if any instance of PDC 246 match the unit layout cell of the new SRAM memory cell. At block 606, when no substantial match is found, the computer device implements the 3D field solver to discretely calculate a new instance of IPC for the unit layout cell. For example, the EDA system 200 implements the 3D field solver to discretely calculate a new IPC for the unit layout cell of the new SRAM memory cell. Finally, at block 608, the computer device appends the database to include the unit layout cell as a new one of the PDCs, and the calculated IPC for the unit layout cell as an IPC for the new one of the PDCs. For example, the EDA system 200 appends database 244 so that the unit layout cell of the new SRAM memory cell becomes a new of the PDCs 246 and the calculated IPC becomes a new one of the IPCs 248 for the new PDC 246.

Figure 7:
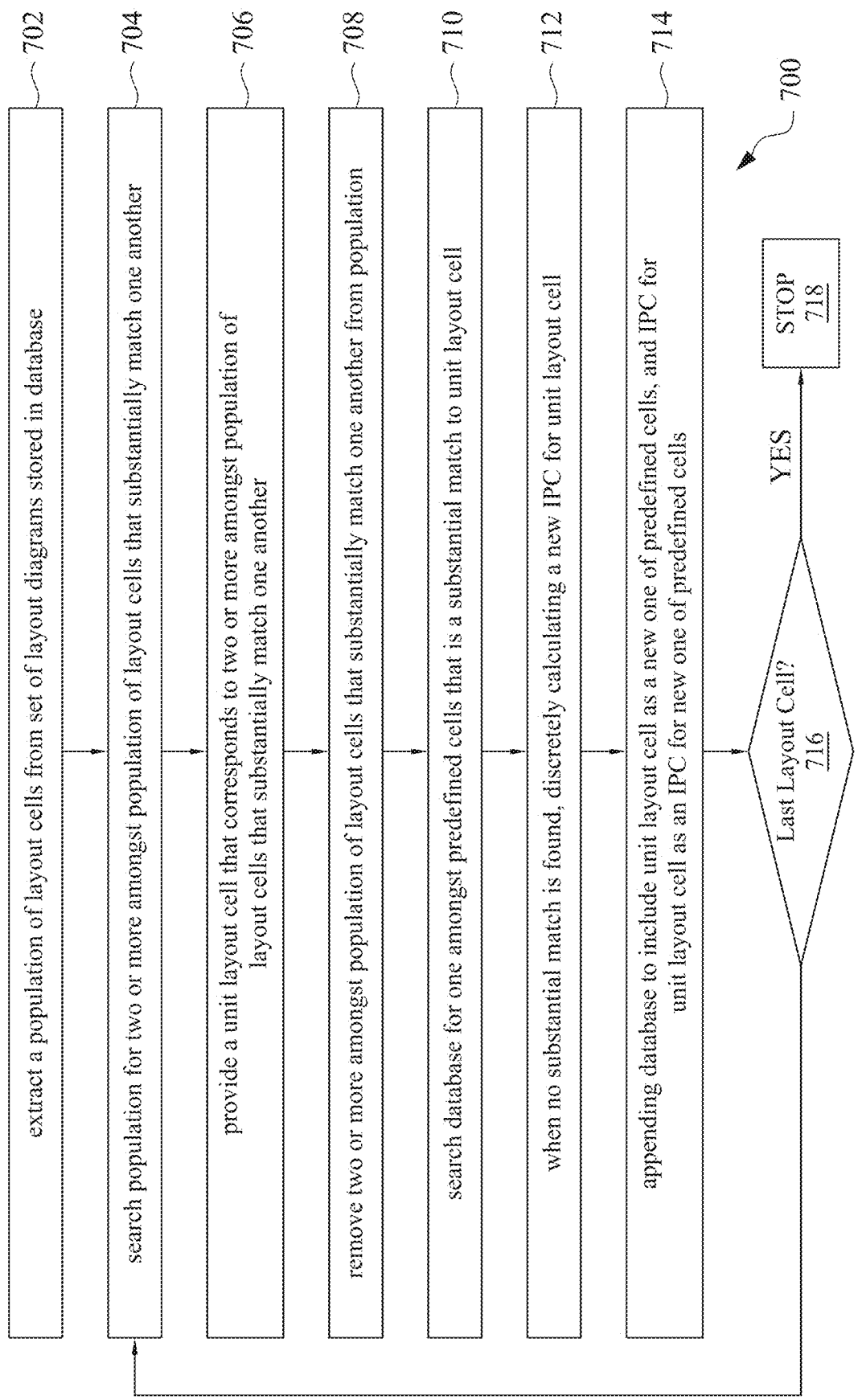
FIG. 7 is a flow diagram 700 of procedures that are implemented prior to selecting a candidate cell, in accordance with some embodiments.

FIG. 7 is a flow diagram 700 of procedures that are implemented prior to selecting a candidate cell, in accordance with some embodiments.

In some embodiments, the database stores a set of layout diagrams that include layout cells. The layout cells in the set of layout diagrams can be searched to find layout cells that are repeated through one or more of the layout diagrams. In this manner, the PC description of these layout cells are already provided as PDC 246 before blocks 302-334 in FIGS. 3A-3E are implemented on a particular layout diagram.

At block 702, the computer device extracts a population of layout cells from the set of layout diagrams in the database. For example, the EDA system 200 extracts a population of layout cells from the set of layout diagrams 254 stored in database 244. At block 704, the computer device searches the population for two or more amongst the population of layout cells that substantially match one another. For example, the EDA system 200 searches the population of layout cells from the set of layout diagrams 254 for at least two that substantially match one another. At block 706, the computer device provides a unit layout cell that corresponds to the two or more amongst the population of layout cells that substantially match one another. In some embodiments, the EDA system 200 is configured to generate a unit cell layout for the two or more layout cells that match one another or simply picks one of the layout cells as the representative unit layout cell. At block 708, the computer device removes the two or more amongst the population of layout cells that substantially match one another from the population. For example, the EDA system 200 removes the two or more repeating layout cells from the population of layout cells extracted from the layout diagrams 254. This is because all of these repeating layout cells are characterized by the unit layout cell.

At block 710, the computer device searches the database for one amongst the PDC that is a substantial match to the unit layout cell. For example, the EDA system 200 searches database 244 to determine if any of PDC 246 match the unit layout cell. At block 712, when no substantial match is found, the computer device implements the 3D field solver to discretely calculate a new IPC for the unit layout cell. For example, the EDA system 200 implements the 3D field solver to discretely calculate a new IPC for the unit layout cell. Finally, at block 714, the computer device appends the database to include the unit layout cell as a new one of the PDCs, and the calculated IPC for the unit layout cell as an instance of the IPC for the new one of the PDCs. For example, the EDA system 200 appends database 244 so that the unit layout cell becomes a new instance of PDCs 246 and the calculated IPC becomes a new instance of the IPCs 248 for the new PDC 246.

Flow then proceeds to block 716. Block 716 is a decision block where the computer device determines whether there is another layout cell in the population of layout cell from the set of layout diagrams. If so, the procedure stops at block 718. If layout cell is not the last layout cell in the population, the computer device iterates to the next layout cell in the population of layout cells and returns to block 704. The computer device implements blocks 704-716 for the next layout cell. In this manner, the computer device incrementally iterates through all of the layout cells in the population of layout cells extracted from the set of layout diagrams in the database. In this manner, the IPC of repeated layout cells is already provided in the database.

Figure 8:
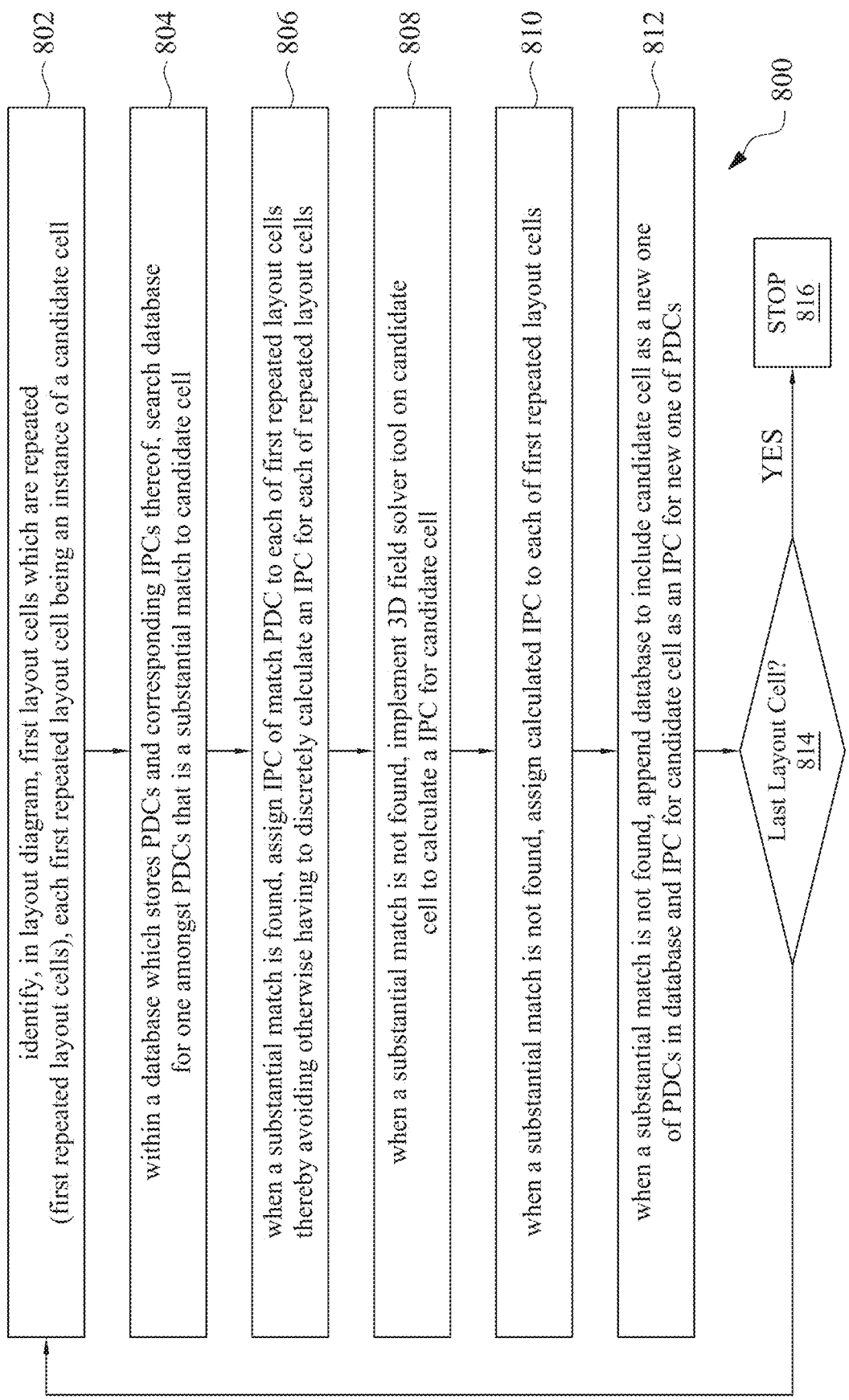
FIG. 8 is a flowchart of another embodiment of obtaining the intracell parasitic capacitance of repeated layout cells in a layout diagram, in accordance with some embodiments.

FIG. 8 is a flowchart 800 of another embodiment of obtaining the IPC of repeated layout cells in a layout diagram, in accordance with some embodiments.

At block 802, the computer device identifies, in the layout diagram, first layout cells which are repeated (first repeated layout cells), each first repeated layout cell being an instance of a candidate cell. For example, with respect to floorplan diagram 100 in FIG. 1, the EDA system 200 identifies layout cell 102B in row 1, columns 2-3, layout cell 102B in row 1, columns 5-6, layout cell 102B in row 5, columns 2-3, and layout cell 102B in row 5, columns 5-6 as repeated layout cells.

In some embodiments, the computer devices identifies the first layout cells which are repeated by extracting the layout cells from the layout diagram thereby resulting in an initial population. For example, the EDA system 200 extracts layout cells 102A, 102B, 102C, 102D, 102E from the layout diagram 100 as an initial population of layout cells 102A, 102B, 102C, 102D, 102E. The computer device then searches the initial population two or more amongst the layout cells that are a substantial match with one another. Once the computer device determines that there is a substantial match among the two or more of the layout cells, the computer device removes the repeating layout cells from the initial population. In some embodiments, the locations of the repeating layout cells are flagged so that these positions are skipped for other iterations. This is because as explained below, the IPC is determined for the repeated cell layouts simultaneously.

For example, the EDA system 200 selects layout cell 102B in row 1, columns 2-3 and searches the initial population of layout cells 102A, 102B, 102C, 102D, 102E to determine which of layout cells 102A, 102B, 102C, 102D, 102E substantially matches layout cell 102B in row 1, columns 2-3. In this case, the EDA system 200 would find that layout cell 102B in row 1, columns 5-6, layout cell 102B in row 5, columns 2-3, and layout cell 102B in row 5, columns 5-6 substantially match layout cell 102B in row 1, columns 5-6. Each of layout cell 102B in row 1, columns 2-3, layout cell 102B in row 1, columns 5-6, layout cell 102B in row 5, columns 2-3, and layout cell 102B in row 5, columns 5-6 as repeated layout cells are instances of unit cell (Unit-cell-B). The EDA system 200 then flags locations (row 1, columns 2-3), (row 1, columns 5-6), (row 5, columns 2-3), (row 5, columns 5-6) so that these locations are skipped and thereby all of layout cells 102B are removed from the initial population.

At block 804, within the database which stores PDCs and corresponding IPCs thereof, the computer device searches the database for one amongst the PDCs that is a substantial match to the candidate cell. In the example above, the EDA system 200 searches database 244 for one amongst the PDCs 246 that substantially matches unit cell (Unit-cell-B) as the candidate cell.

At block 806, the computer device assigns the IPC of the matching PDC to each of the first repeated layout cells thereby avoiding otherwise having to discretely calculate an IPC for each of the repeated layout cells. In the example above, the EDA system 200 assigns IPC 248 of PDC 246 that substantially matches the unit cell (Unit-cell-B) to each of layout cell 102B in row 1, columns 2-3, layout cell 102B in row 1, columns 5-6, layout cell 102B in row 5, columns 2-3, and layout cell 102B in row 5, columns 5-6.

At block 808, when a substantial match is not found, the computer device implements the 3D field solver tool on the candidate cell to discretely calculate an IPC for the candidate cell when the candidate cell does not match any of the PDC. In some embodiments, the 3D field solver tool is configured to solve Laplace's equation in order to obtain the IPC for the candidate cell. For example, the EDA system 200 implements the 3D field solver tool on unit cell (Unit-cell-B), when none of PDC 246 substantially matches unit cell (Unit-cell-B). At block 810, the computer device assigns the calculated IPC to the candidate cell in the layout diagram when the candidate cell does not match any of the PDC in the database. For example, the EDA system 200 assigns the calculated IPC to layout cell 102B in row 1, columns 2-3, layout cell 102B in row 1, columns 5-6, layout cell 102B in row 5, columns 2-3, and layout cell 102B in row 5, columns 5-6. At block 812, the computer device appends the database to include: the candidate cell as a new one of the PDCs and the IPC for the candidate cell as an IPC for the new one of the PDCs. For example, the EPA system 200 appends database 244 to include: unit cell (Unit-cell-B) as a new one of PDC 246 and the calculated IPC for the nit cell (Unit-cell B) as an IPC 248 for the new one of PDC 246. In this manner, the IPC for all of layout cell 102B in row 1, columns 2-3, layout cell 102B in row 1, columns 5-6, layout cell 102B in row 5, columns 2-3, and layout cell 102B in row 5, columns 5-6 that substantially match unit cell (Unit-cell-B) is determined simultaneously.

Flow then proceeds to block 814. Block 814 is a decision block where the computer device determines whether there is another layout cell in the population of layout cells from the set of layout diagrams. If so, the procedure stops at block 816. If layout cell is not the last layout cell in the population, the computer device iterates to the next layout cell in the population of layout cells and returns to block 802. Once all the IPC for each of the repeated cells is determined, unrepeated layout cells remain in some embodiments. In this case, blocks 302-334 can be implemented on unrepeated layout cells except that the locations of repeated cells are skipped.

Figure 9:
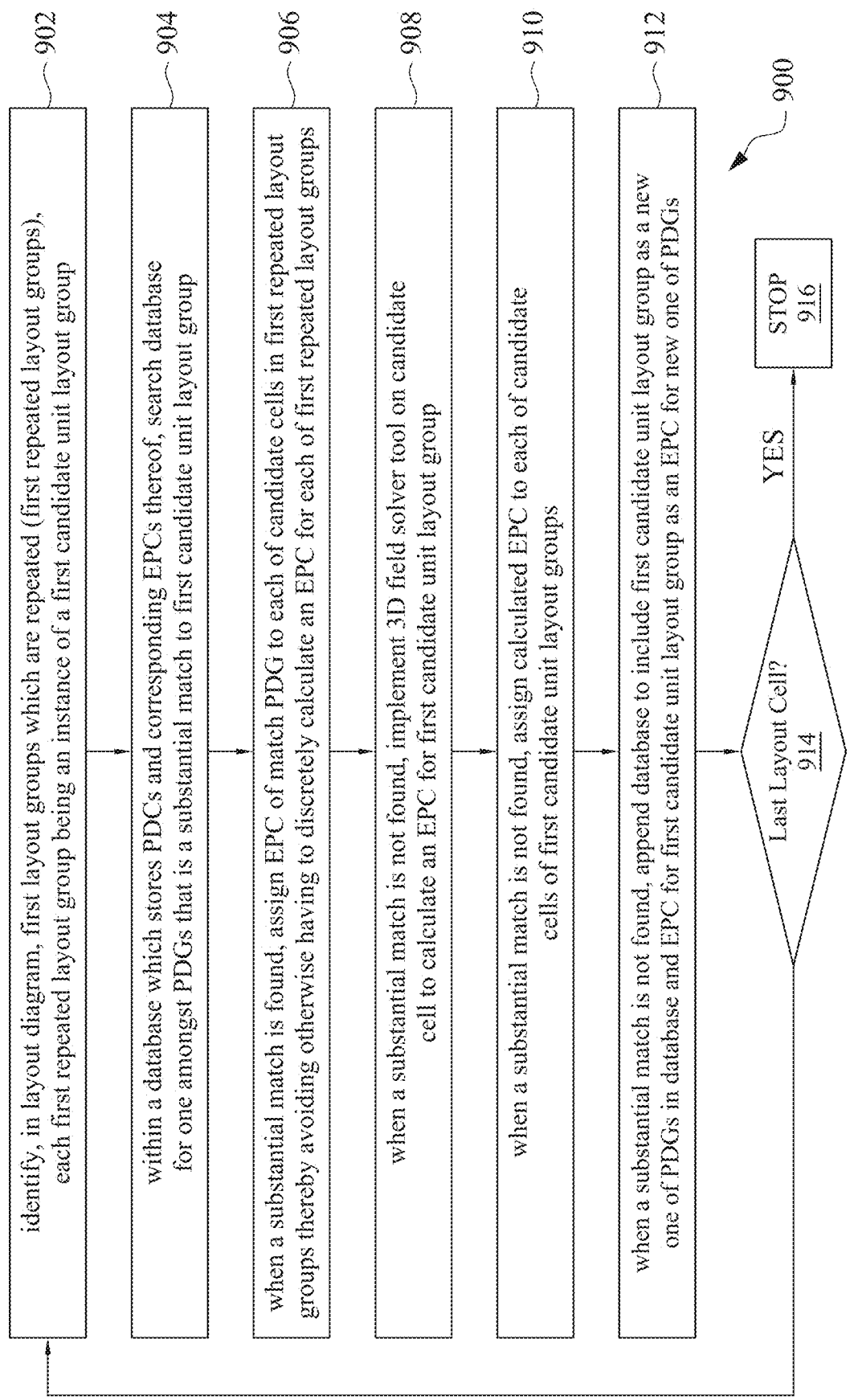
FIG. 9 is a flowchart of another embodiment of obtaining the intercell parasitic capacitance of repeated layout groups in a layout diagram.

FIG. 9 is a flowchart 900 of another embodiment of obtaining the EPC of repeated layout groups in a layout diagram, in accordance with some embodiments.

At block 902, the computer device identifies, in the layout diagram, first layout groups which are repeated (first repeated layout groups), each first repeated layout group being an instance of a first candidate unit layout group. Each of the first layout groups includes the candidate cell and a set of one or more layout cells adjacent to the candidate cell. For example, with respect to floorplan diagram 100 in FIG. 1, an iteration is considered where layout cell 102A in row 2, column 4, which is an instance of unit cell (Unit-cell-A) in row 2, column 4 is the candidate cell in a layout group. Assuming a window size of 1, adjacent cells include layout cell 102B in row 1, column 2-3 (which is an instance of Unit-cell-B), layout cell 102D in row 1, column 4 (which is an instance of Unit-cell-D), layout cell 102B in row 1, columns 5-6 (which is an instance of Unit-cell-B), another layout cell 102A in row 2, column 3 (which is an instance of Unit-cell-A) adjacent and to the left, another layout cell 102A in row 2, column 5 (which is an instance of Unit-cell-A) adjacent and to the right, and another bottom adjacent row of layout cell 102A in row 3, column 3 (which is an instance of Unit-cell-A), layout cell 102A in row 3, column 4 (which is an instance of Unit-cell-A), layout cell 102A in row 3, column 5 (which is an instance of Unit-cell-A). For convenience, the layout groups with layout cell 102A in row 2, in the column 4 as the center cell and adjacent layout cell 102B in row 1, column 2-3 (which is an instance of Unit-cell-B), layout cell 102D in row 1, column 4 (which is an instance of Unit-cell-D), layout cell 102B in row 1, columns 5-6 (which is an instance of Unit-cell-B), another layout cell 102A in row 2, column 3 (which is an instance of Unit-cell-A) adjacent and to the left, another layout cell 102A in row 2, column 5 (which is an instance of Unit-cell-A) adjacent and to the right, and another bottom adjacent row of layout cell 102A in row 3, column 3 (which is an instance of Unit-cell-A), layout cell 102A in row 3, column 4 (which is an instance of Unit-cell-A), layout cell 102A in row 3, column 5 (which is an instance of Unit-cell-A) is referred to as layout group 1. Another layout group includes layout cell 102A (which is an instance of Unit-cell-A) in row 4, column 4 as the candidate cell and the adjacent cells of adjacent row of layout cell 102B in row 5, columns 2-3 (which is an instance of Unit-cell-B), layout cell 102D in row 5, column 4 (which is an instance of Unit-cell-D), layout cell 102B in row 5, columns 5-6 (which is an instance of Unit-cell-B), another layout cell 102A in row 4, column 3 (which is an instance of Unit-cell-A) adjacent and to the left, another layout cell 102A in row 5, column 5 (which is an instance of Unit-cell-A) adjacent and to the right, and another top adjacent row of layout cell 102A in row 3, column 3 (which is an instance of Unit-cell-A), layout cell 102A in row 3, column 4 (which is an instance of Unit-cell-A), layout cell 102A in row 3, column 5 (which is an instance of Unit-cell-A). For convenience, this group is identified as layout group 2. The EDA system 200 identifies layout group 1 and layout group 2 as both substantially matching a layout unit group of unit cell (Unit-cell-A) as the subject PDC adjacent to a vertically adjacent row of unit cell (Unit-cell-B), unit cell (Unit-cell-D), unit cell (Unit-cell-B), another unit cell (Unit-cell-A) adjacent and to the left, another unit cell (Unit-cell-A) adjacent and to the right, and another vertically adjacent row of unit cell (Unit-cell-A), unit cell (Unit-cell-A), unit cell (Unit-cell-A). For convenience, this group of unit cells is identified as the relevant candidate unit layout group. The EPA system identifies layout group 1 and layout group 2 as repeated instances of the relevant candidate layout group.

In some embodiments, the computer device removes the candidate cells of the repeated layout groups from the initial population of layout cells. For example, the EDA system 200 removes the locations of the layout cells in group 1 and in group 2 from further iterations of the blocks 902-916 of FIG. 9. Accordingly, in further iterations, the locations of the layout cells in group 1 and the locations of the layout cells in group 2 locations are skipped.

At block 904, within the database which stores PDGs and corresponding EPCs thereof, the computer device searches the database for one amongst the PDGs that is a substantial match to the relevant candidate unit layout group. In the example above, the EDA system 200 searches database 244 for one amongst the PDGs 250 that substantially matches the relevant candidate unit layout group.

At block 906, the computer device assigns the EPC of the matching PDG to each of the candidate cells in the first repeated layout groups thereby avoiding otherwise having to discretely calculate an EPC for each of the first repeated layout groups. In the example above, the EDA system 200 assigns the instance of EPC 252 of the corresponding instance of PDG 250 that substantially matches the relevant layout group to layout cell 102A in row 2, column 4 and layout cell 102A in row 4, column 4 of layout group 2.

At block 908, when a substantial match is not found, the computer device implements the 3D field solver tool on the first candidate unit layout group to discretely calculate an EPC for each of the first repeated layout groups when the first candidate unit layout group does not match any instance of PDC 246. In some embodiments, the 3D field solver tool is configured to solve Laplace's equation in order to obtain the EPC for the first candidate unit layout group. For example, the EDA system 200 implements the 3D field solver tool on relevant candidate unit layout group, when no instance of PDG 250 substantially matches the relevant layout group. At block 910, the computer device assigns the calculated EPC to the candidate cells of the first candidate layout groups when the first candidate unit layout group does not match any instance of PDC 246 in database 244. In the starting iteration described above, EDA system 200 assigns the calculated EPC to layout cell 102A in row 2, column 4 of layout group 1 and layout cell 102A in row 4, column 4 of layout group 2. At block 912, the computer device appends database 244 to include: the first candidate unit layout group as a new instance of PDG 250 and the EPC for the first candidate unit layout group as a corresponding new instance of EPC 252 for the new instance PDG 250. For example, the EPA system 200 appends database 244 to include: a layout unit group of unit cell (Unit-cell-A) as the subject PDC adjacent to a vertically adjacent row of unit cell (Unit-cell-B), unit cell (Unit-cell-D), unit cell (Unit-cell-B), another unit cell (Unit-cell-A) adjacent and to the left, another unit cell (Unit-cell-A) adjacent and to the right, and another vertically adjacent row of unit cell (Unit-cell-A), unit cell (Unit-cell-A), unit cell (Unit-cell-A) (i.e., the first candidate unit layout group) as a new one of PDG 250 and the calculated EPC for the first candidate unit layout group as an EPC 252 for the new one of PDG 250.

Flow then proceeds to block 914. Block 914 is a decision block where the computer device determines whether there is another layout cell in the population of layout cells from the set of layout diagrams. If so, the procedure stops at block 916. If layout cell is not the last layout cell in the population, the computer device iterates to the next layout cell in the population of layout cells and returns to block 902. Once all the EPC for all of the layout groups is determined, unrepeated layout groups remain in some embodiments. In this case, blocks 302-334 can be implemented on unrepeated layout groups except that the locations of layout cells of repeated layout groups are skipped.

Figure 10:
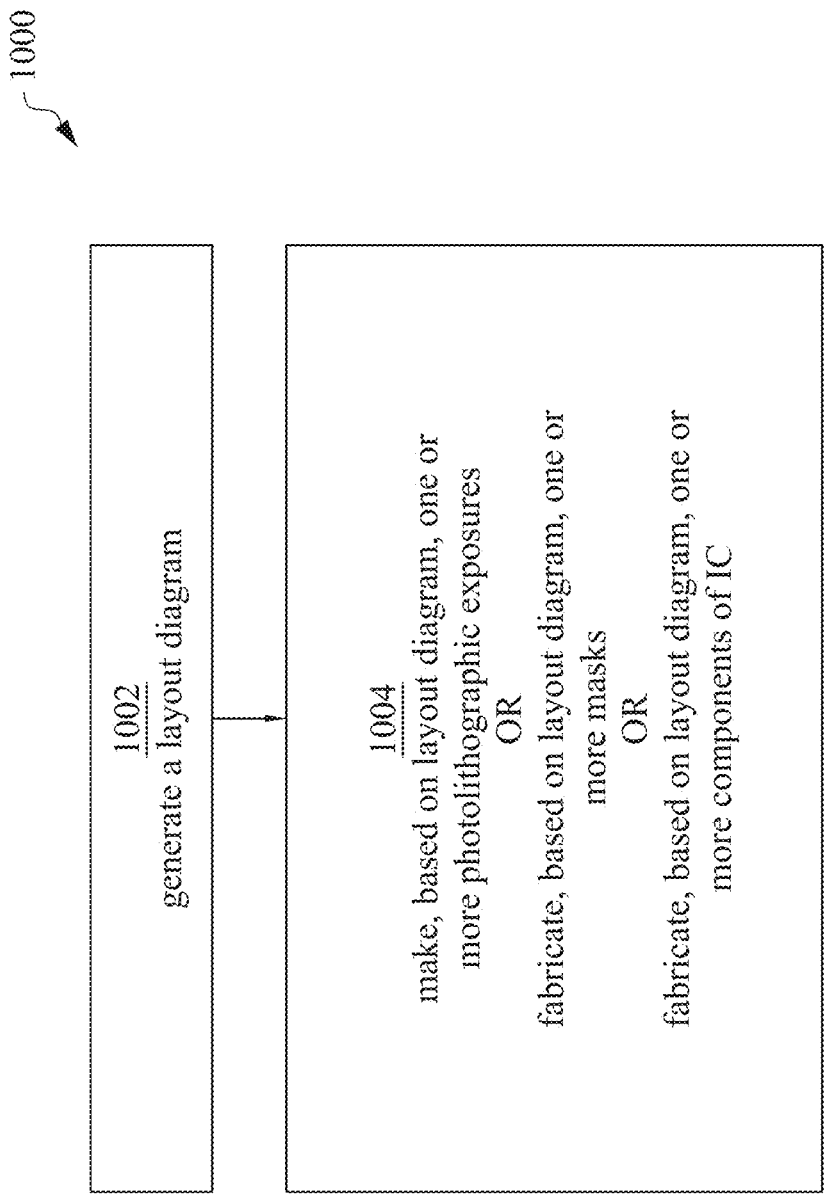
FIG. 10 is a flowchart of a method of generating a layout diagram, in accordance with some embodiments.

FIG. 10 is a flowchart of a method 1000 of generating a layout diagram, in accordance with some embodiments.

Method 1000 is implementable, for example, using EDA system 2 (FIG. 2, discussed above) and an integrated circuit (IC) manufacturing system 1100 (FIG. 11, discussed below), in accordance with some embodiments. Regarding method 1000, examples of the layout diagram include layout diagram 100 in FIG. 1 and layout diagram 400 in FIGS. 4A-4C and FIGS. 5A-5C disclosed herein, or the like. Examples of a semiconductor device which can be manufactured according to method 1000 include semiconductor devices represented by layout diagram 100 in FIG. 1 and layout diagram 400 in FIGS. 4A-4C and FIGS. 5A-5C disclosed herein.

In FIG. 10, method 1000 includes blocks 1002-1004. At block 1002, a layout diagram is generated which, among other things, include patterns represent one or more circuit regions as disclosed above in layout diagram 400 in FIGS. 4A-4C and FIGS. 5A-5C disclosed herein. In some embodiments, blocks 302-344 in FIGS. 3A-3E, blocks 602-608 in FIG. 6, blocks 702-718 in FIG. 7, blocks 802-816 in FIG. 8 and/or blocks 902-916 in FIG. 9 are implemented in block 1002.

At block 1004, based on the layout diagram, at least one of (A) one or more photolithographic exposures are made or (b) one or more semiconductor masks are fabricated or (C) one or more components in a layer of a semiconductor device are fabricated. See discussion below of IC manufacturing system 1100 in FIG. 11 below.

Figure 11:
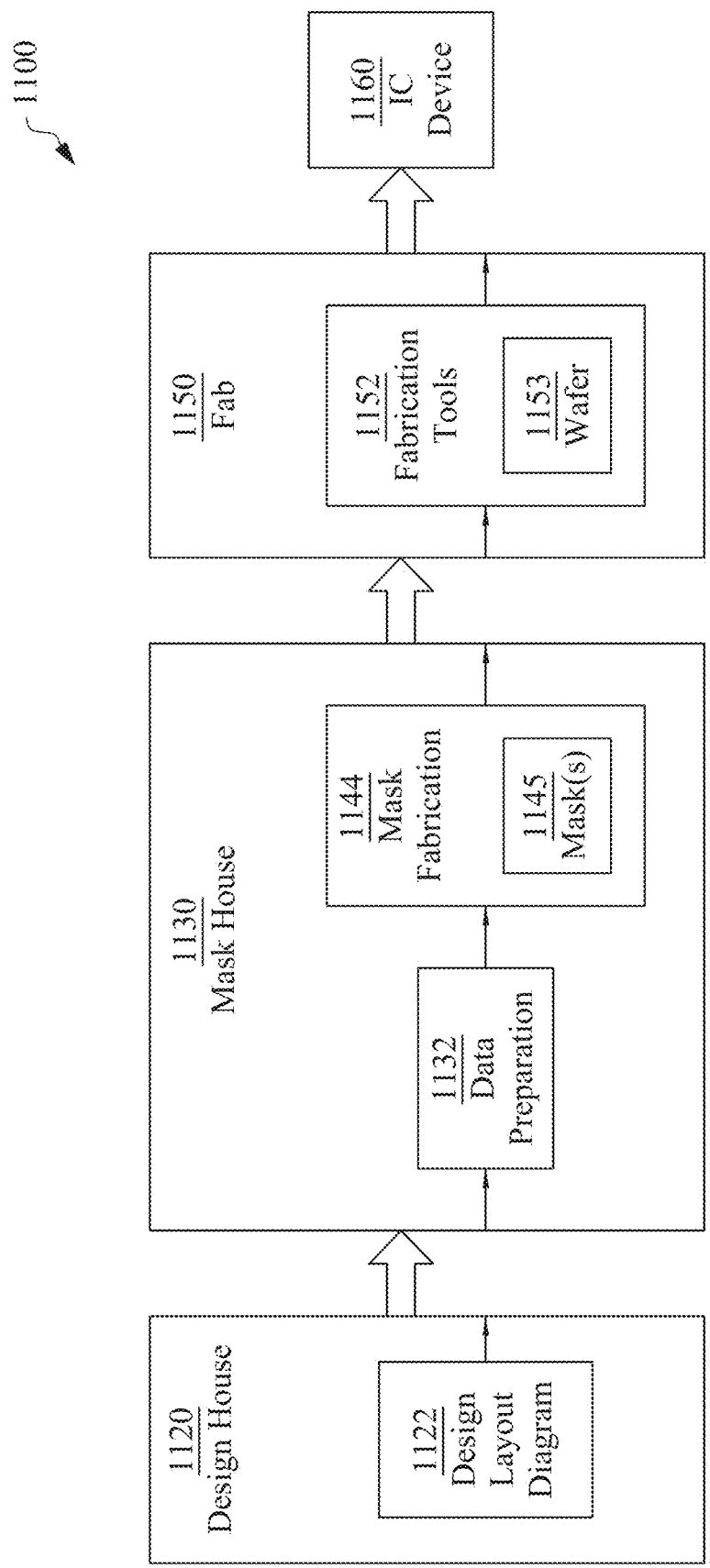
FIG. 11 is a block diagram of an integrated circuit (IC) manufacturing system, and an IC manufacturing flow associated therewith, in accordance with some embodiments.

FIG. 11 is a block diagram of an integrated circuit (IC) manufacturing system 1100, and an IC manufacturing flow associated therewith, in accordance with some embodiments.

The manufacturing system 1100 is configured to manufacture semiconductor devices represented by layout diagram 100 in FIG. 1 and layout diagram 400 in FIGS. 4A-4C and FIGS. 5A-5C disclosed herein.

In some embodiments, based on a layout diagram, e.g., at least one of (A) one or more semiconductor masks or (b) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns designed for an IC device 1160. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 can be expressed in a GDSII file format or DFII file format.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file ("RDF"). Mask data preparation 1132 provides the RDF to mask fabrication 1144. Mask fabrication 1144 includes a mask writer. A mask writer converts the RDF to an image on a substrate, such as a mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are repeated to further refine IC design layout diagram 1122.

It should be understood that the above description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 may be executed in a variety of different orders.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 is an IC fabrication business that includes one or more manufacturing facilities for the fabrication of a variety of different IC products. In some embodiments, IC Fab 1150 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1150 includes fabrication tools 1152 configured to execute various manufacturing operations on semiconductor wafer 1153 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multi-level interconnects, and the like (formed at subsequent manufacturing steps).

Details regarding an integrated circuit (IC) manufacturing system (e.g., system 1100 of FIG. 11), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In one embodiment, a method of manufacturing a semiconductor device, a corresponding layout diagram being stored on a non-transitory computer-readable medium, the layout diagram including layout cells, the method comprising generating the layout diagram including: selecting a candidate cell from amongst the layout cells in the layout diagram; within a database which stores predefined cells and corresponding PC descriptions thereof, searching the database for one amongst the predefined cells that is a substantial match to candidate cell; and when as substantial match is found, assigning the PC description of the matching predefined cell to the candidate cell.

In some embodiments, a method of manufacturing a semiconductor device is disclosed. A corresponding layout diagram is stored on a non-transitory computer-readable medium, the layout diagram including layout cells, the method includes generating the layout diagram by: selecting a candidate cell from amongst the layout cells in the layout diagram; within a database which stores predefined cells and corresponding parasitic capacitance (PC) descriptions thereof, searching the database for one amongst the predefined cells that is a substantial match to the candidate cell; and when a substantial match is found, assigning the PC description of the matching predefined cell to the candidate cell. In some embodiments, the method further includes: iterating the selecting a candidate cell, the searching the database and the assigning the PC description; and wherein: the layout diagram includes a roster which lists each of the layout cells; and the iterating of the selecting a candidate cell incrementally progresses through each of the layout cells listed in the roster. In some embodiments, the method further includes: when no substantial match is found between the predefined cells and the candidate cell, discretely calculating a PC description for the candidate cell; and appending the database to include: the candidate cell as a new one of the predefined cells; and the PC description for the candidate cell as a PC description for the new one of the predefined cells. In some embodiments, the discretely calculating a new PC description for the candidate cell includes: implementing a 3D field solver tool on the candidate cell to calculate the new PC description. In some embodiments, the candidate cell is a first candidate cell; and the method further comprises: selecting a second candidate cell from amongst the layout cells in the layout diagram; searching the database for one amongst the predefined cells that is a substantial match to the second candidate cell; and when as substantial match is found, assigning the PC description of the matching predefined cell to the second candidate cell thereby avoiding otherwise having to discretely calculate a PC description for the second candidate cell. In some embodiments, the PC description of the candidate cell includes an intracell PC description of the candidate cell.

In some embodiments, the selecting the candidate cell includes: extracting an initial population of layout cells from the layout diagram; searching the initial population for two or more layout cells amongst the initial population that substantially match one another (first repeating layout cells); and a chosen one of the first repeating layout cells (chosen first repeating layout cell) is the candidate cell. In some embodiments, the method further includes: bulk-assigning the PC description of the matching predefined cell to remaining ones of the first repeating layout cells other than the chosen first repeating layout cell thereby avoiding otherwise having to discretely calculate a PC description for each of the remaining ones of the first repeating layout cells. In some embodiments, the method further includes: iterating the searching the initial population, the searching the database, the bulk-assigning the PC description, and appending the database and wherein: the layout diagram includes a roster which lists each of the layout cells; and the iterating of the selecting a candidate cell incrementally progresses through each of the layout cells listed in the roster. In some embodiments, the method further includes: based on the layout diagram, at least one of: (A) making one or more photolithographic exposure; (B) fabricating one or more semiconductor masks; or (C) fabricating at least one component in a layer of a semiconductor integrated circuit.

In another embodiment, a non-transitory computer-readable medium having stores thereon computer executable instructions representing a method of generating a layout diagram, the layout diagram including layout cells which are organized into layout groups, each layout group including a central cell and a set of one or more of the cells which are adjacent to the central cell (adjacent cells), the computer executable instructions being executable by at least one processor to perform the method includes generating the layout diagram by: selecting a candidate layout group from amongst the layout groups; within a database which stores predefined groups and corresponding parasitic capacitance (PC) descriptions thereof, each predefined group including a subject predefined cell and a corresponding set of one or more of the predefined cells which are adjacent to the subject predefined cell, searching the database for a matching predefined group amongst the predefined groups that is a substantial match to the candidate cell group; and when as substantial match is found, assigning the PC description of the matching predefined group to the candidate layout group. In some embodiments, the method further includes: iterating the selecting a candidate layout group, the searching the database and the assigning the PC description; and wherein: the layout diagram includes a roster which lists each of the layout groups; and the iterating of the selecting candidate layout group incrementally progresses through each of the layout groups listed in the roster. In some embodiments, the method further includes: when no substantial match is found, discretely calculating a PC description for the candidate layout group; and appending the database to include: the candidate layout group as a new one of the predefined groups; and the PC description for the candidate layout group as a PC description for the new one of the predefined groups. In some embodiments, the discretely calculating a new PC description for the candidate layout group includes: implementing a 3D field solver tool on the candidate layout group to calculate the new PC description. In some embodiments, the PC description for the candidate layout group includes: for at least one adjacent cell in the set of adjacent cells in the candidate layout group, an intercell PC description between the central cell of the candidate layout group and the corresponding adjacent cell of the candidate layout group. In some embodiments, the method further comprising: based on the layout diagram, causing an integrated circuit (IC) manufacturing system to perform at least one of: (A) making one or more photolithographic exposure; (B) fabricating one or more semiconductor masks; or (C) fabricating at least one component in a layer of a semiconductor integrated circuit.

In another embodiment, a system for manufacturing a semiconductor device, the system comprising: at least one processor; at least one non-transitory computer readable medium that stores computer executable code; the at least one non-transitory computer readable storage medium, the computer executable code and the at least one processor being configured to cause the system to generate a layout diagram including layout cells, generation of the layout diagram including: selecting a candidate cell from amongst the layout cells in the layout diagram; within a database which stores predefined cells and corresponding intracell parasitic capacitance (PC) descriptions thereof, searching the database for one amongst the predefined cells that is a substantial match to the candidate cell; and when a substantial match is found, assigning the intracell PC description of the matching predefined cell to the candidate cell. In some embodiments, the generation of the layout diagram further includes: iterating the selecting a candidate cell, the searching the database and the assigning the PC description; and wherein: the layout diagram includes a roster which lists each of the layout cells; and the iterating of the selecting a candidate cell incrementally progresses through each of the layout cells listed in the roster. In some embodiments, the generation of the layout diagram further includes: when no substantial match is found between the predefined cells and the candidate cell, discretely calculating an intracell PC description for the candidate cell; and appending the database to include: the candidate cell as a new one of the predefined cells; and the intracell PC description for the candidate cell as an intracell PC description for the new one of the predefined cells. In some embodiments, the system of further includes at least one of: a masking facility configured to fabricate one or more semiconductor masks based on the layout diagram; or a fabricating facility configured to fabricate at least one component in a layer of a semiconductor integrated circuit based on the layout diagram.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device, a corresponding layout diagram being stored on a non-transitory computer-readable medium, the layout diagram including layout cells, the method comprising generating the layout diagram including:
   selecting a candidate cell from amongst the layout cells in the layout diagram;
   within a database which stores predefined cells and corresponding parasitic capacitance (PC) descriptions thereof, searching the database for one amongst the predefined cells that is a substantial match to the candidate cell; and
   when a substantial match is found, assigning the PC description of the matching predefined cell to the candidate cell.

2. The method of claim 1, further comprising:
   iterating the selecting a candidate cell, the searching the database and the assigning the PC description; and
   wherein:
      the layout diagram includes a roster which lists each of the layout cells; and
      the iterating of the selecting a candidate cell incrementally progresses through each of the layout cells listed in the roster.

3. The method of claim 1, further comprising:
   when no substantial match is found between the predefined cells and the candidate cell, discretely calculating a PC description for the candidate cell; and
   appending the database to include:
      the candidate cell as a new one of the predefined cells; and
      the PC description for the candidate cell as a PC description for the new one of the predefined cells.

4. The method of claim 3, wherein the discretely calculating a new PC description for the candidate cell includes:
   implementing a 3D field solver tool on the candidate cell to calculate the new PC description.

5. The method of claim 1, wherein:
   the candidate cell is a first candidate cell; and
   the method further comprises:

selecting a second candidate cell from amongst the layout cells in the layout diagram;
searching the database for one amongst the predefined cells that is a substantial match to the second candidate cell; and
when a substantial match is found, assigning the PC description of the matching predefined cell to the second candidate cell thereby avoiding otherwise having to discretely calculate a PC description for the second candidate cell.

6. The method of claim 1 wherein:
the PC description of the candidate cell includes an intracell PC description of the candidate cell.

7. The method of claim 1, wherein:
the selecting the candidate cell includes:
extracting an initial population of layout cells from the layout diagram;
searching the initial population for two or more layout cells amongst the initial population o that substantially match one another (first repeating layout cells); and
a chosen one of the first repeating layout cells (chosen first repeating layout cell) is the candidate cell.

8. The method of claim 7, further comprising:
bulk-assigning the PC description of the matching predefined cell to remaining ones of the first repeating layout cells other than the chosen first repeating layout cell thereby avoiding otherwise having to discretely calculate a PC description for each of the remaining ones of the first repeating layout cells.

9. The method of claim 8, further comprising:
iterating the searching the initial population, the searching the database, the bulk-assigning the PC description, and appending the database and
wherein:
the layout diagram includes a roster which lists each of the layout cells; and
the iterating of the selecting a candidate cell incrementally progresses through each of the layout cells listed in the roster.

10. The method of claim 1, further comprising:
based on the layout diagram, at least one of:
(A) making one or more photolithographic exposure;
(B) fabricating one or more semiconductor masks; or
(C) fabricating at least one component in a layer of a semiconductor integrated circuit.

11. A non-transitory computer-readable medium having stored thereon computer executable instructions representing a method of generating a layout diagram, the layout diagram including layout cells which are organized into layout groups, each layout group including a central cell and a set of one or more of the cells which are adjacent to the central cell (adjacent cells), the computer executable instructions being executable by at least one processor to perform the method comprising generating the layout diagram including:
selecting a candidate layout group from amongst the layout groups;
within a database which stores predefined groups and corresponding parasitic capacitance (PC) descriptions thereof, each predefined group including a subject predefined cell and a corresponding set of one or more of the predefined cells which are adjacent to the subject predefined cell,
searching the database for one amongst the predefined groups that is a substantial match to the candidate layout group; and
when a substantial match is found, assigning the PC description of the matching predefined group to the candidate layout group.

12. The non-transitory computer readable medium of claim 11, the method further comprising:
iterating the selecting a candidate layout group, the searching the database and the assigning the PC description; and
wherein:
the layout diagram includes a roster which lists each of the layout groups; and
the iterating of the selecting candidate layout group incrementally progresses through each of the layout groups listed in the roster.

13. The non-transitory computer readable medium of claim 11, the method further comprising:
when no substantial match is found, discretely calculating a PC description for the candidate layout group; and
appending the database to include:
the candidate layout group as a new one of the predefined groups; and
the PC description for the candidate layout group as a PC description for the new one of the predefined groups.

14. The non-transitory computer readable medium of claim 13, wherein the discretely calculating a new PC description for the candidate layout group includes:
implementing a 3D field solver tool on the candidate layout group to calculate the new PC description.

15. The non-transitory computer readable medium of claim 11, wherein the PC description for the candidate layout group includes:
for at least one adjacent cell in the set of adjacent cells in the candidate layout group,
an intercell PC description between the central cell of the candidate layout group and the corresponding adjacent cell of the candidate layout group.

16. The non-transitory computer readable medium of claim 11, wherein the method further comprising:
based on the layout diagram, causing an integrated circuit (IC) manufacturing system to perform at least one of:
(A) making one or more photolithographic exposure;
(B) fabricating one or more semiconductor masks; or
(C) fabricating at least one component in a layer of a semiconductor integrated circuit.

17. A system for manufacturing a semiconductor device, the system comprising:
at least one processor;
at least one non-transitory computer readable storage medium that stores computer executable code;
the at least one non-transitory computer readable storage medium, the computer executable code and the at least one processor being configured to cause the system to generate a layout diagram including layout cells, generation of the layout diagram including:
selecting a candidate cell from amongst the layout cells in the layout diagram;
within a database which stores predefined cells and corresponding intracell parasitic capacitance (PC) descriptions thereof, searching the database for one amongst the predefined cells that is a substantial match to the candidate cell; and
when a substantial match is found, assigning the intracell PC description of the matching predefined cell to the candidate cell.

18. The system of claim 17, wherein the generation of the layout diagram further includes:

iterating the selecting a candidate cell, the searching the database and the assigning the PC description; and
wherein:
the layout diagram includes a roster which lists each of the layout cells; and
the iterating of the selecting a candidate cell incrementally progresses through each of the layout cells listed in the roster.

19. The system of claim 17, wherein the generation of the layout diagram further includes:
when no substantial match is found between the predefined cells and the candidate cell, discretely calculating an intracell PC description for the candidate cell; and
appending the database to include:
the candidate cell as a new one of the predefined cells; and
the intracell PC description for the candidate cell as an intracell PC description for the new one of the predefined cells.

20. The system of claim 17, further comprising at least one of:
a masking facility configured to fabricate one or more semiconductor masks based on the layout diagram; or
a fabricating facility configured to fabricate at least one component in a layer of a semiconductor integrated circuit based on the layout diagram.

\* \* \* \* \*